US008823505B2

(12) United States Patent
Maekawa et al.

(10) Patent No.: US 8,823,505 B2
(45) Date of Patent: Sep. 2, 2014

(54) TIRE AIR PRESSURE DETECTING DEVICE, TIRE AIR PRESSURE MONITORING SYSTEM, AND TIRE AIR PRESSURE NOTIFICATION METHOD

(75) Inventors: Takahiro Maekawa, Sagamihara (JP); Tetsuro Hirohama, Hiratsuka (JP); Takashi Shima, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 154 days.

(21) Appl. No.: 13/266,315

(22) PCT Filed: Jun. 23, 2010

(86) PCT No.: PCT/IB2010/001512
§ 371 (c)(1),
(2), (4) Date: Oct. 26, 2011

(87) PCT Pub. No.: WO2011/004229
PCT Pub. Date: Jan. 13, 2011

(65) Prior Publication Data
US 2012/0044064 A1 Feb. 23, 2012

(30) Foreign Application Priority Data
Jul. 9, 2009 (JP) ................................. 2009-162982

(51) Int. Cl.
*B60C 23/00* (2006.01)
*B60C 23/02* (2006.01)
*B60C 23/04* (2006.01)

(52) U.S. Cl.
CPC ......... *B60C 23/0408* (2013.01); *B60C 23/0455* (2013.01); *B60C 23/0484* (2013.01); *B60C 23/0406* (2013.01); *B60C 23/0459* (2013.01)
USPC ............................. 340/442; 73/146.2; 116/34

(58) Field of Classification Search
CPC .............. B60C 23/006; B60C 23/0401; B60C 23/0408; B60C 23/0413; B60C 23/0416
USPC ............ 340/442–448; 73/146–146.8; 116/34; 152/415–431; 417/231–233
See application file for complete search history.

(56) References Cited

U.S. PATENT DOCUMENTS 5,109,213 A * 4/1992 Williams ...................... 340/447
2002/0101341 A1* 8/2002 Yamagiwa et al. ........... 340/447
(Continued)

FOREIGN PATENT DOCUMENTS

JP 4124373 B2 7/2008
JP 2006-507990 A 3/2009

OTHER PUBLICATIONS

A Written Opinion of the International Search Authority for International Application No. PCT/IB2010/001512, dated Sep. 21, 2010, mailed Oct. 1, 2010.

(Continued)

Primary Examiner — Tai T Nguyen
Assistant Examiner — Orlando Bousono
(74) Attorney, Agent, or Firm — Global IP Counselors, LLP

(57) ABSTRACT

A tire air pressure detecting device includes an air pressure detecting unit, a transmitting unit, a running state detecting unit, an air pressure change rate detecting section and a frequency adjustment section. The frequency adjustment section is configured to adjust a transmitting frequency at which the detected value of the tire air pressure detected by the air pressure detecting unit is externally transmitted by the transmitting unit according to the running state detected by the running state detecting unit and the air pressure change rate detected by the air pressure change rate detecting section. The frequency adjustment section is further configured to variably set a threshold value for switching the transmitting frequency from low frequency to high frequency according to the running state and the air pressure change rate.

19 Claims, 29 Drawing Sheets

(56) References Cited

U.S. PATENT DOCUMENTS

| | | | |
|---|---|---|---|
| 2003/0079536 A1* | 5/2003 | Fischer et al. | 73/146 |
| 2004/0021562 A1* | 2/2004 | Prenninger | 340/445 |
| 2004/0066288 A1* | 4/2004 | Okumura | 340/445 |
| 2004/0099055 A1* | 5/2004 | Komatsu et al. | 73/146 |
| 2004/0212487 A1* | 10/2004 | Yagi et al. | 340/445 |
| 2004/0233049 A1* | 11/2004 | Harada et al. | 340/442 |
| 2005/0110623 A1 | 5/2005 | Schulze et al. | |
| 2005/0231344 A1* | 10/2005 | Ogawa | 340/442 |
| 2005/0242936 A1* | 11/2005 | Watabe | 340/442 |
| 2005/0275517 A1* | 12/2005 | Tsukamoto et al. | 340/442 |
| 2005/0280523 A1* | 12/2005 | Watabe | 340/445 |
| 2006/0001534 A1* | 1/2006 | Shida et al. | 340/445 |
| 2006/0015225 A1* | 1/2006 | McQuade et al. | 701/29 |
| 2006/0052920 A1* | 3/2006 | Watabe | 701/29 |
| 2006/0176164 A1* | 8/2006 | Osumi et al. | 340/444 |
| 2006/0220815 A1* | 10/2006 | Thomas | 340/447 |
| 2006/0220817 A1* | 10/2006 | Schofield et al. | 340/447 |
| 2006/0283241 A1* | 12/2006 | Hammerschmidt | 73/146.3 |
| 2007/0040660 A1* | 2/2007 | Miller et al. | 340/442 |
| 2007/0279203 A1* | 12/2007 | Thomas et al. | 340/447 |

OTHER PUBLICATIONS

An International Preliminary Report on Patentability for International Application No. PCT/IB2010/001512, dated Sep. 6, 2011, mailed Sep. 7, 2011.

An English translation of the Russian Decision on Grant of corresponding Russian Application No. 2012104521/11 (006819), issued on Apr. 1, 2013.

An English translation of the Chinese Office Action for the corresponding Chinese Application No. 201080027633.1, issued on Sep. 30, 2013.

An English translation of the Korean Preliminary Rejection of the corresponding Korean Application No. 10-2012-7000428, issued on Jun. 13, 2013.

* cited by examiner

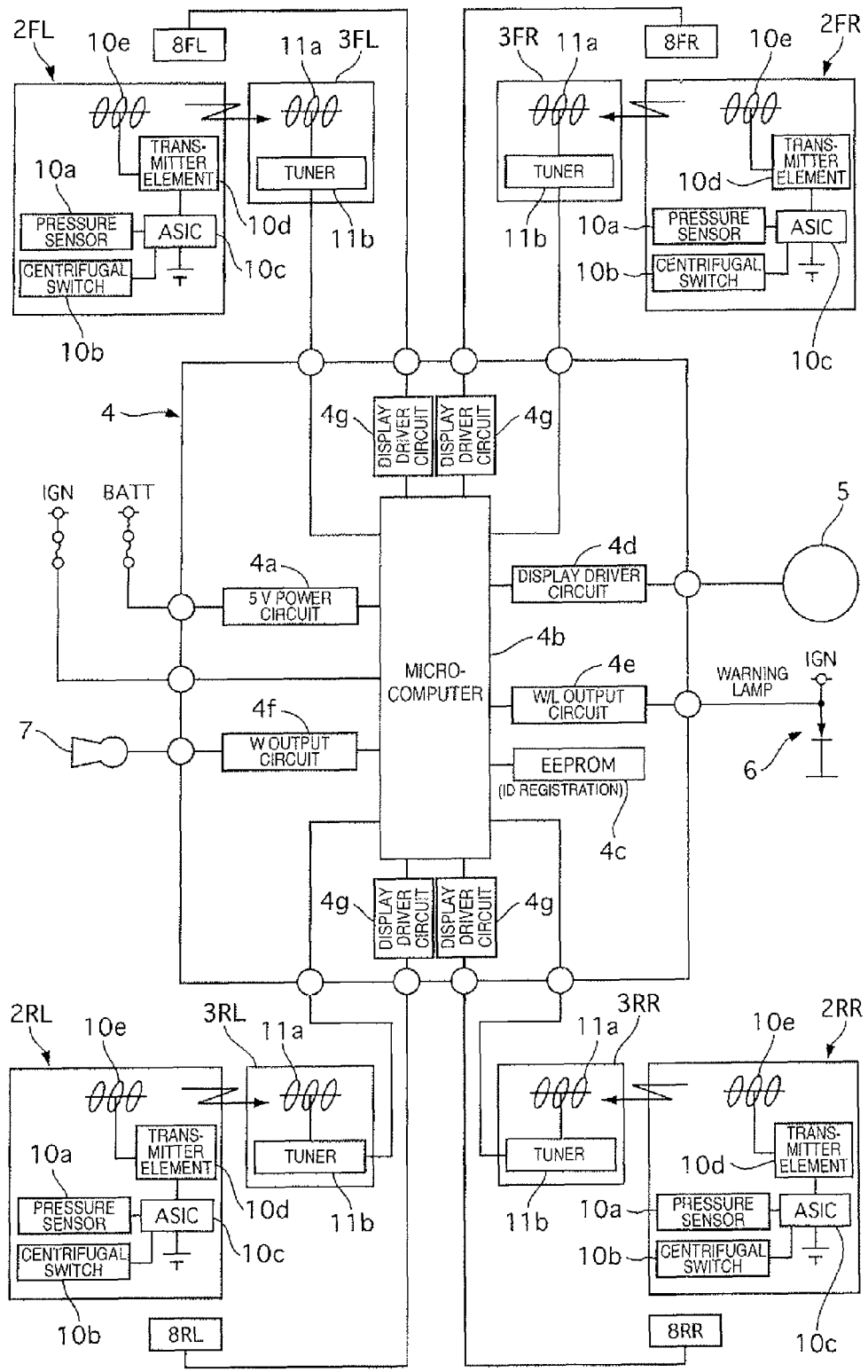
F I G. 2

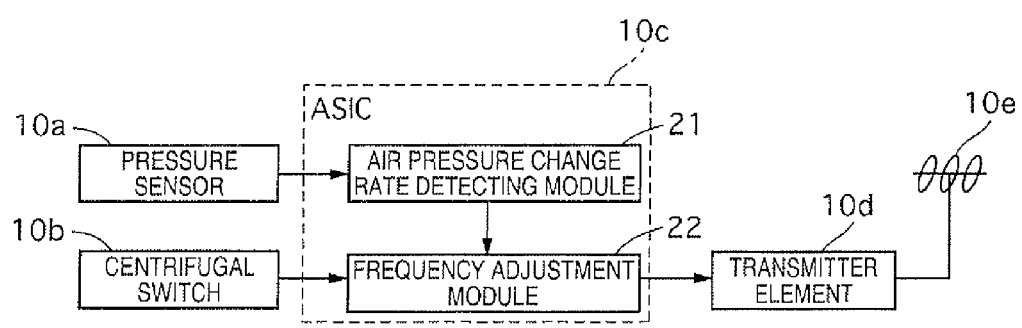
F I G. 3

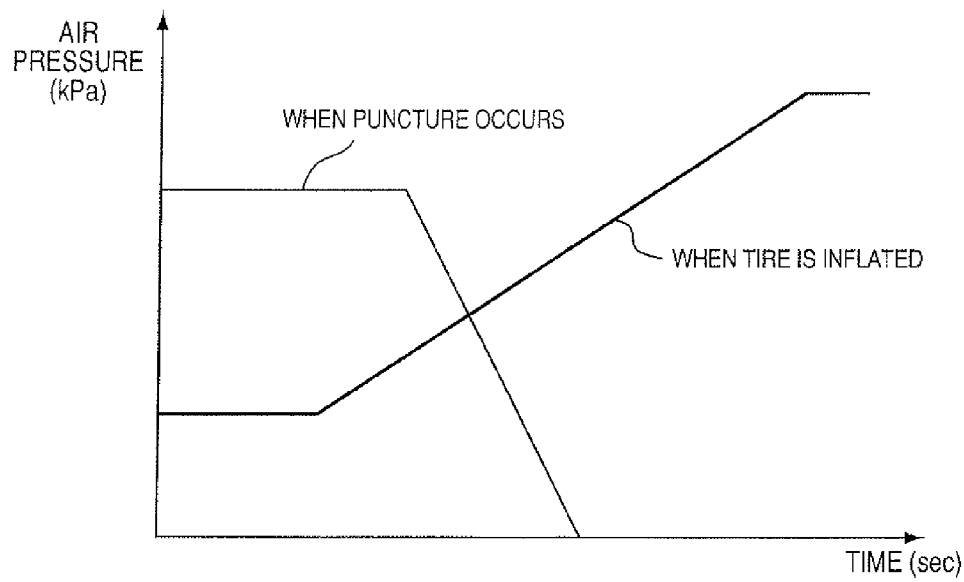
F I G. 5
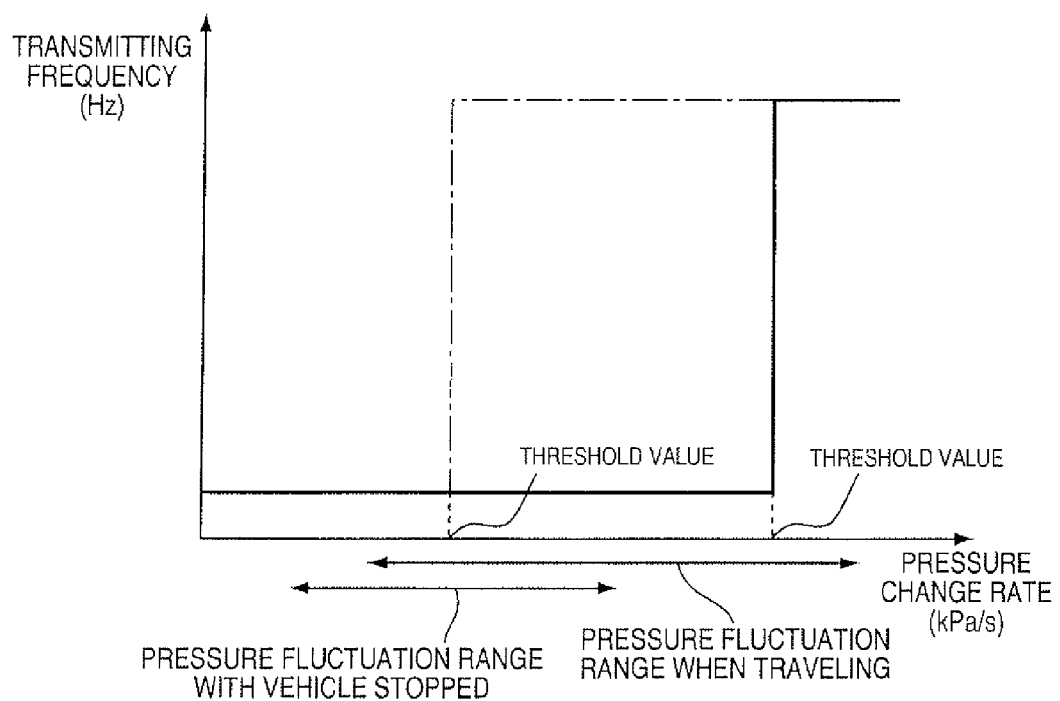
F I G. 6

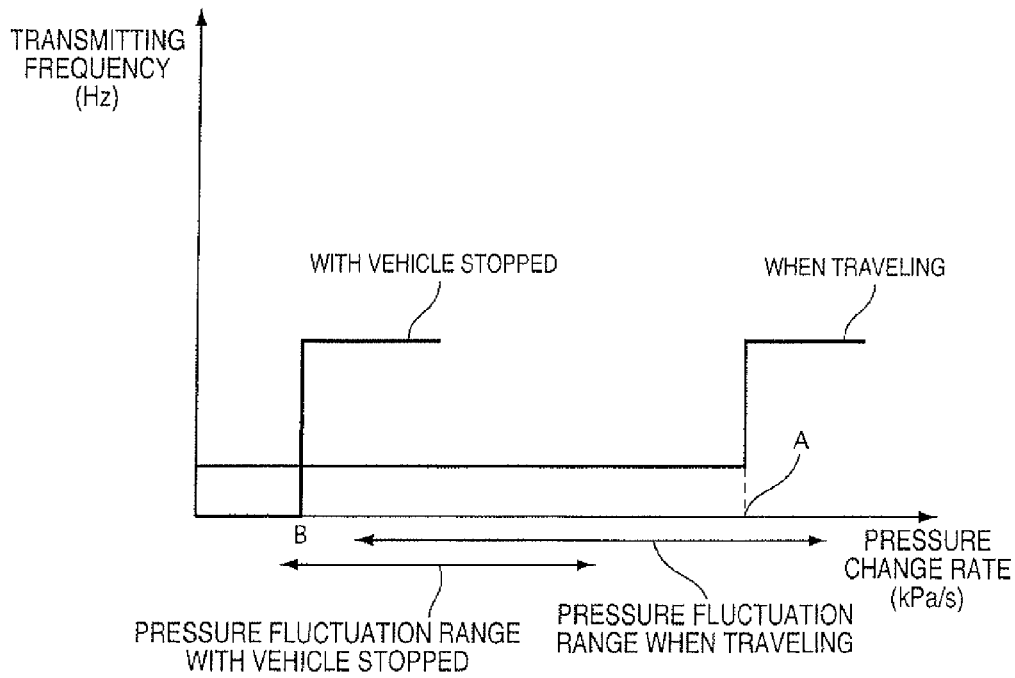
F I G. 7
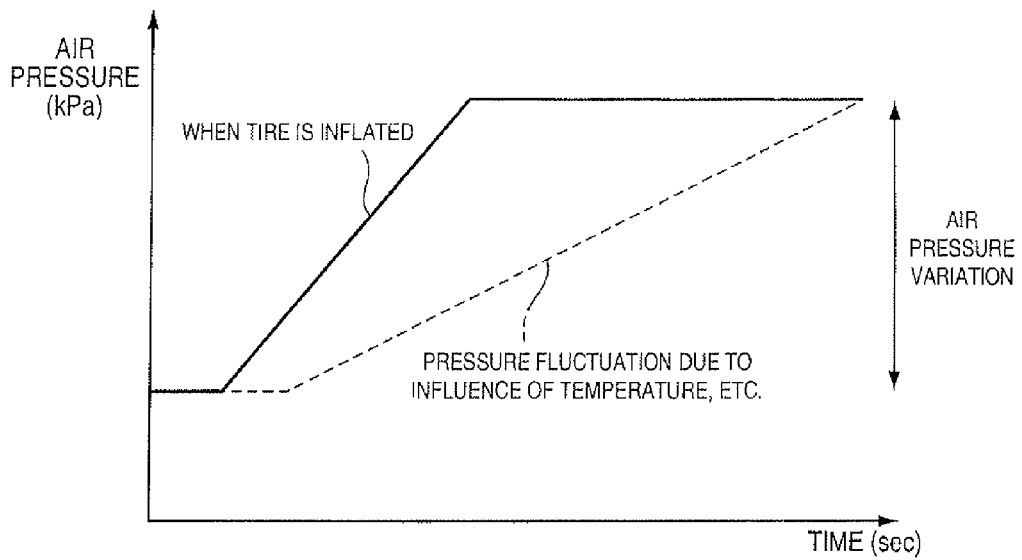
F I G. 8

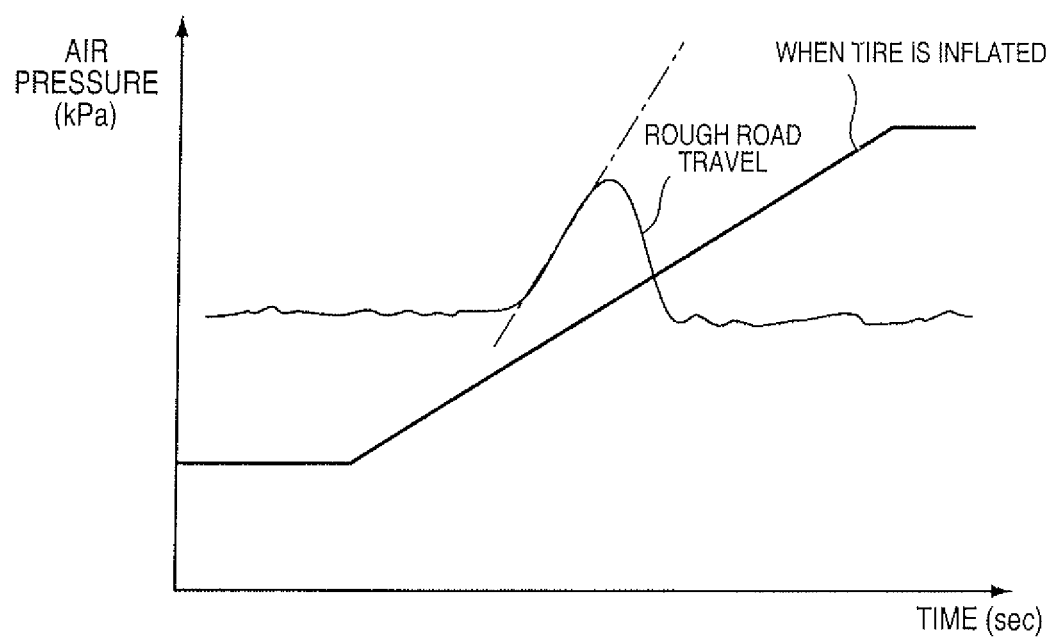
F I G. 9

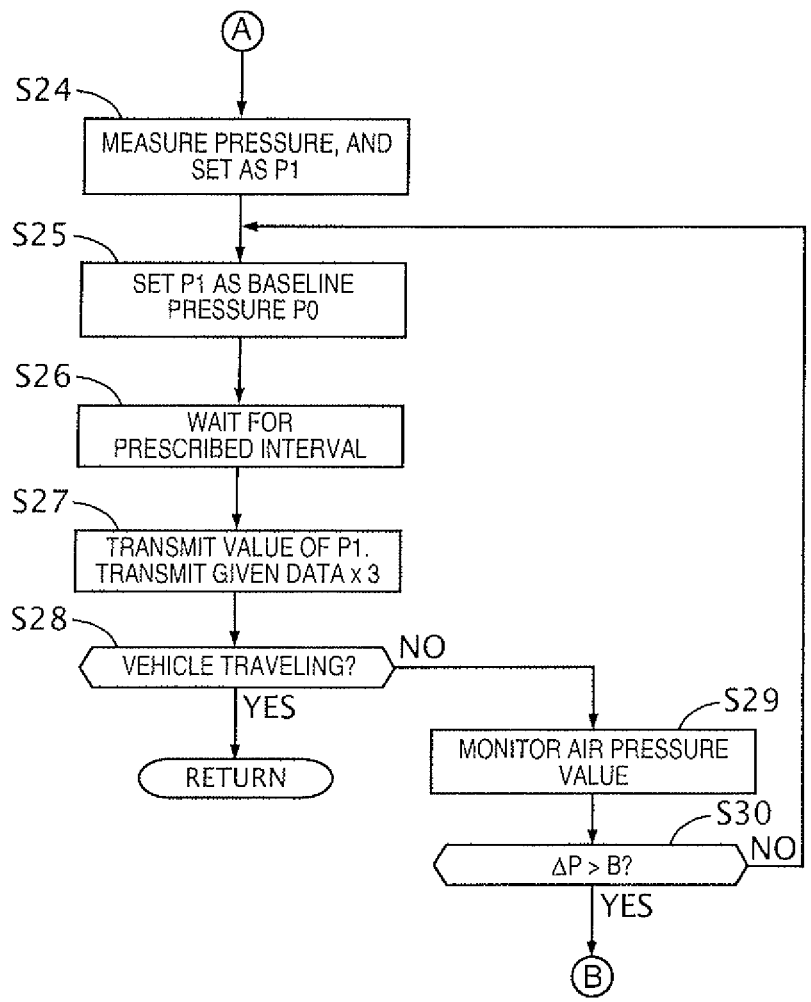
F I G. 12

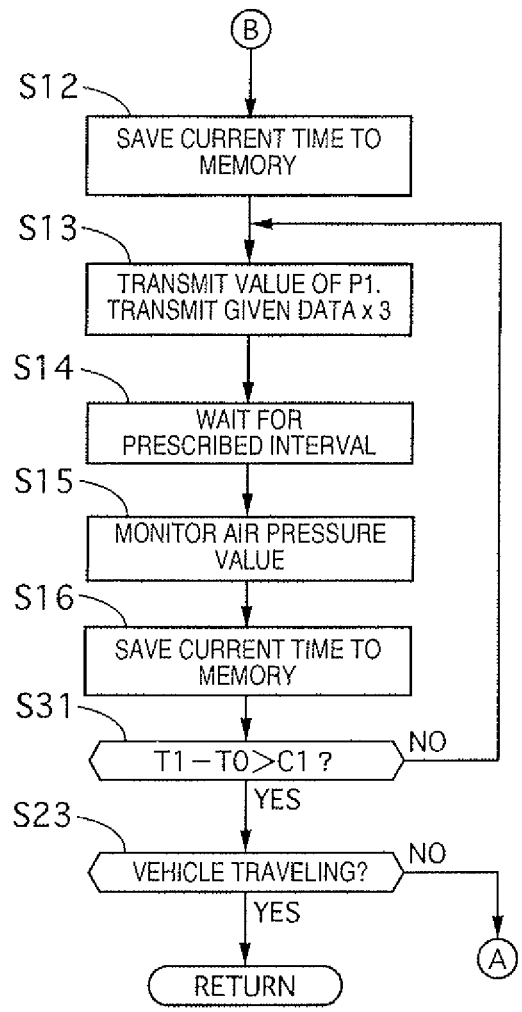
F I G. 13

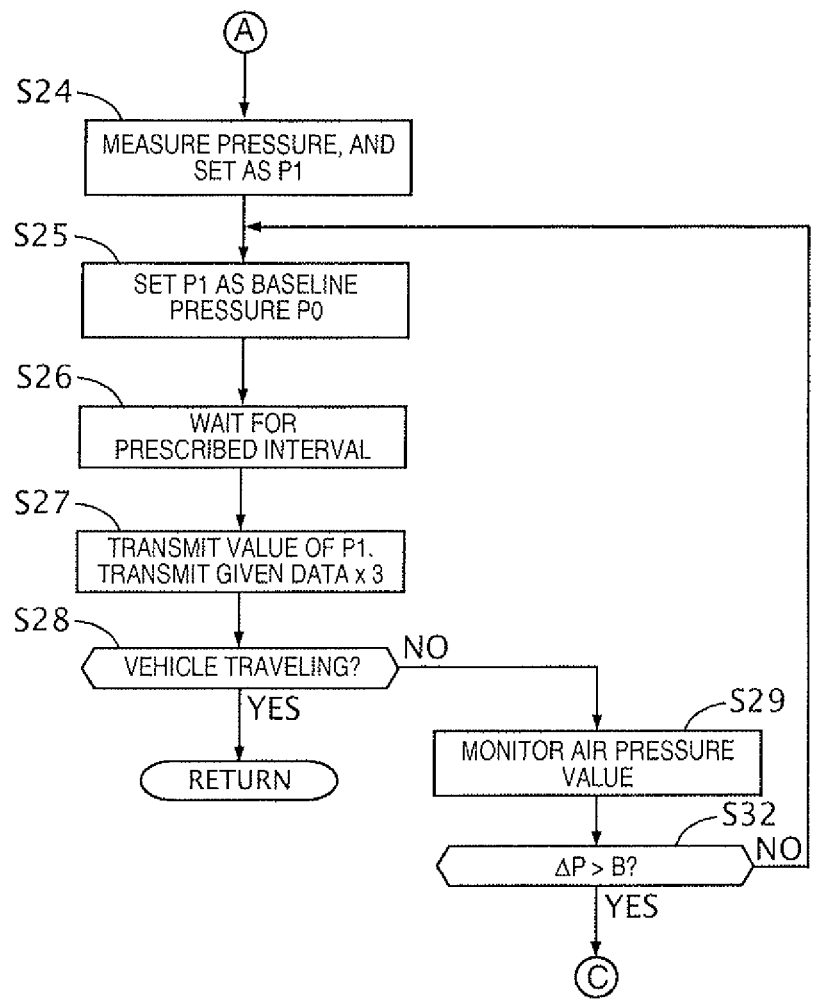
F I G. 14

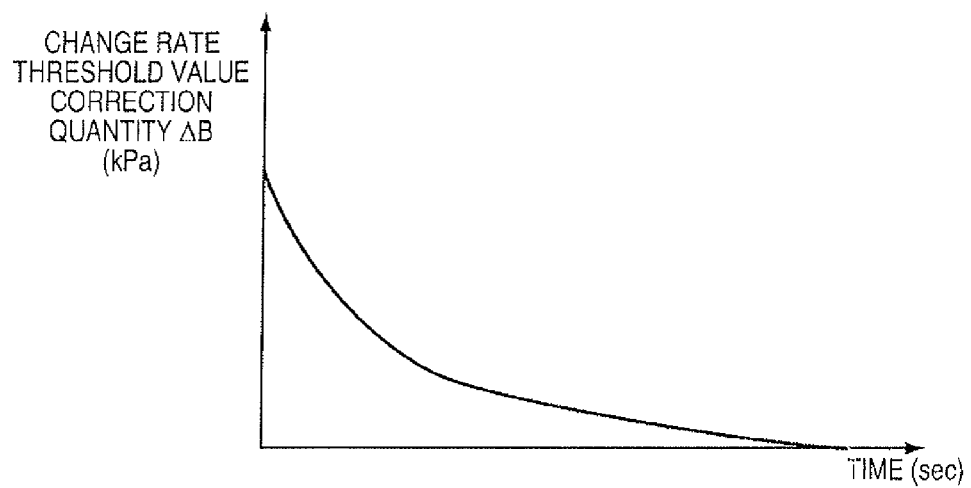
F I G. 22

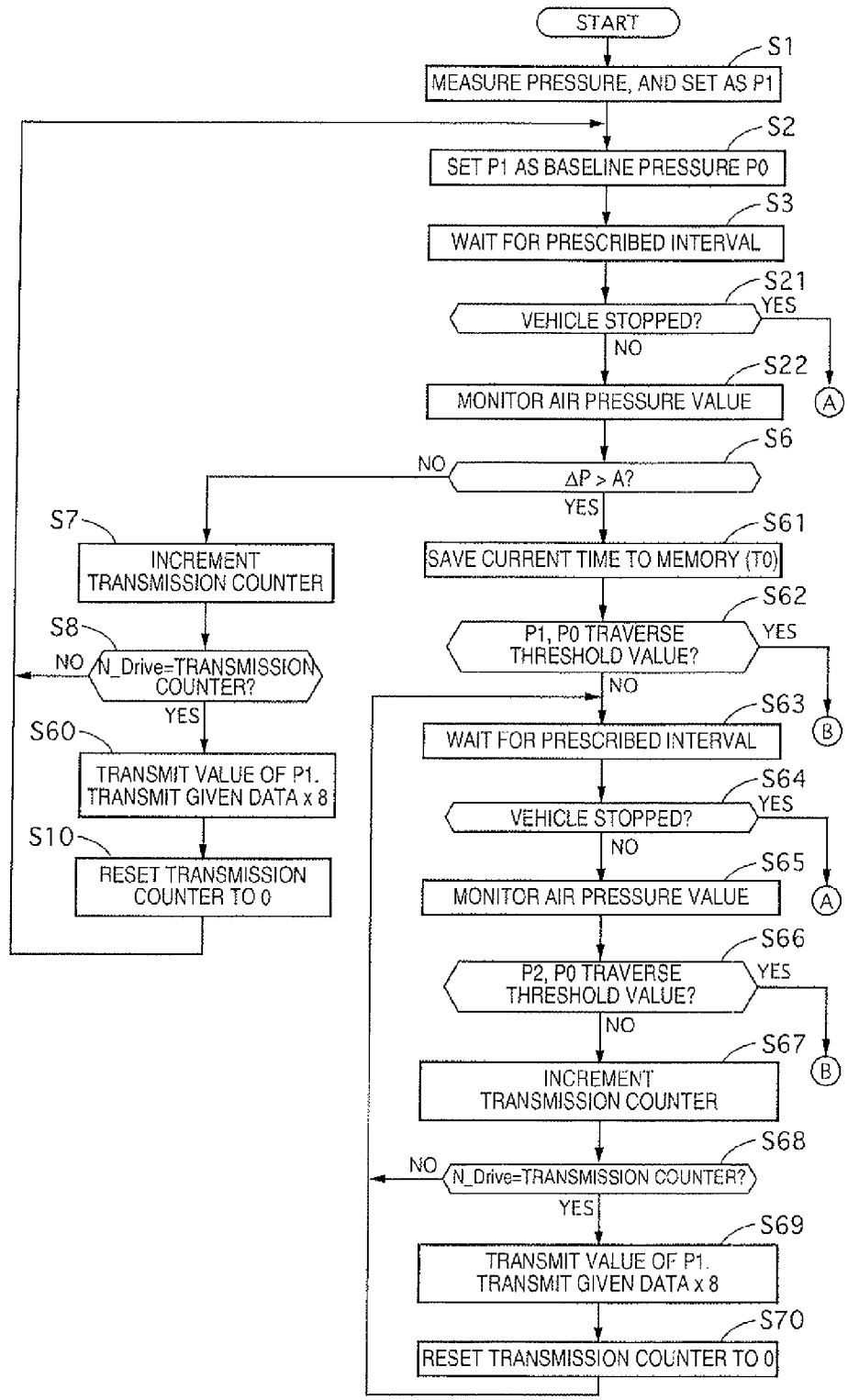
F I G. 25

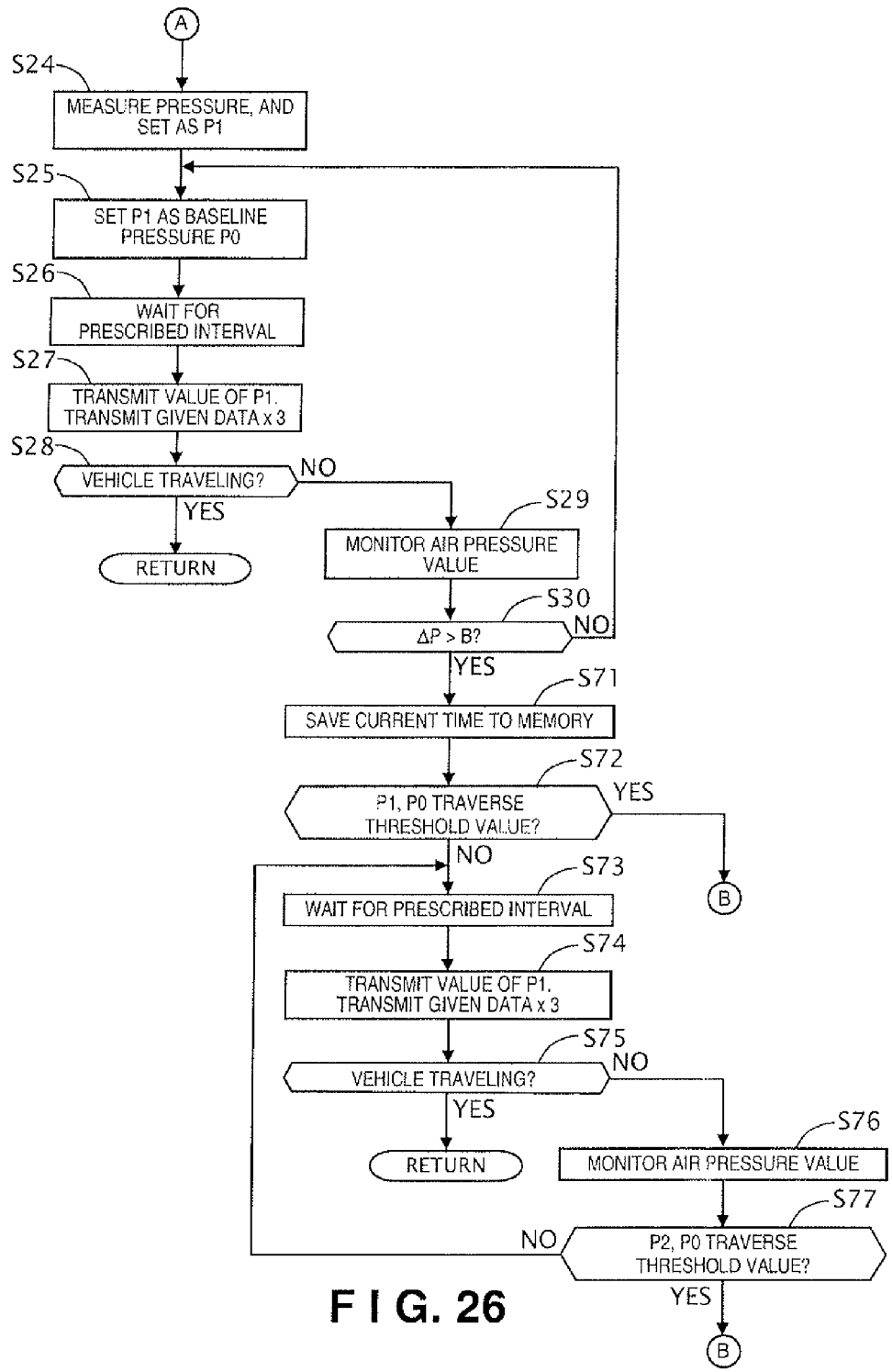
F I G. 26

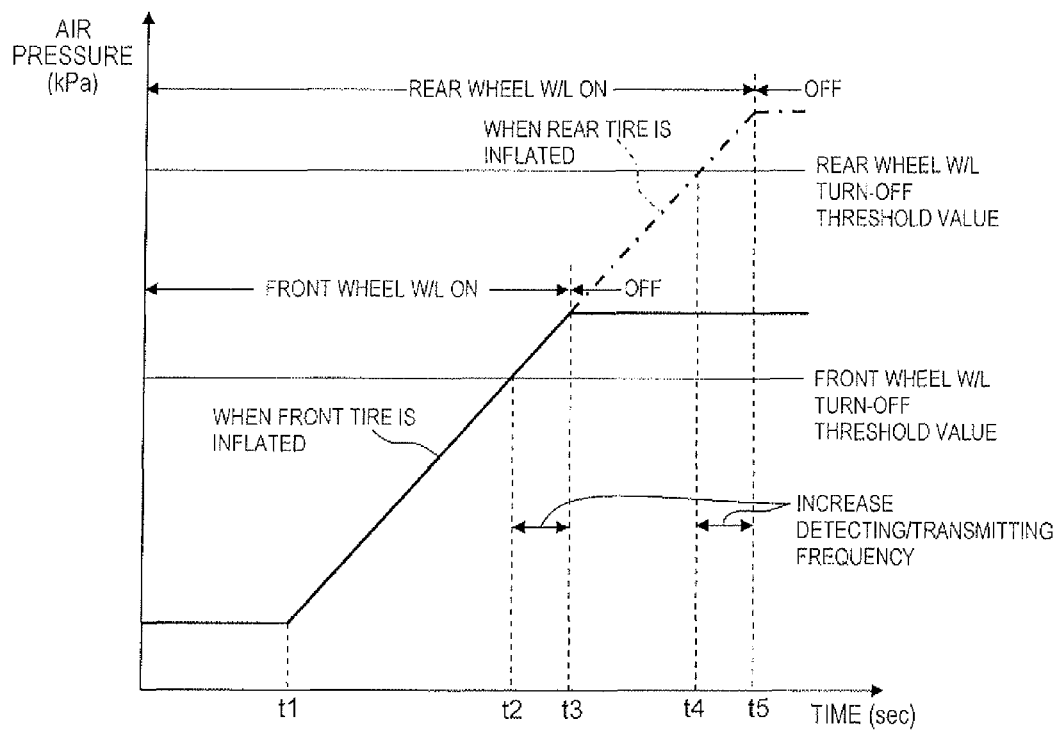
F I G. 29
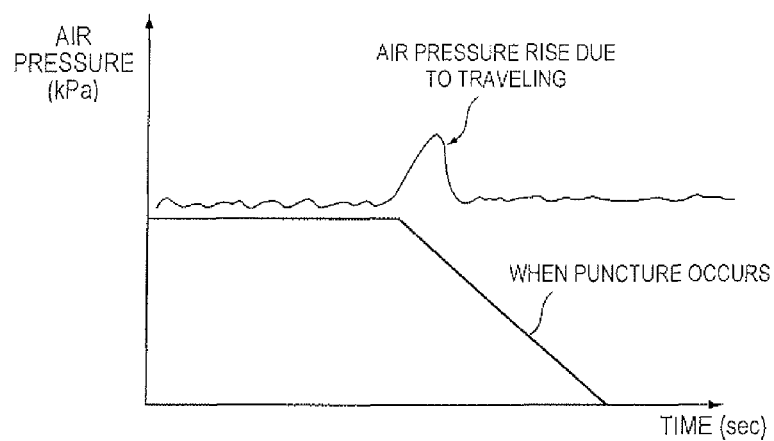
F I G. 30

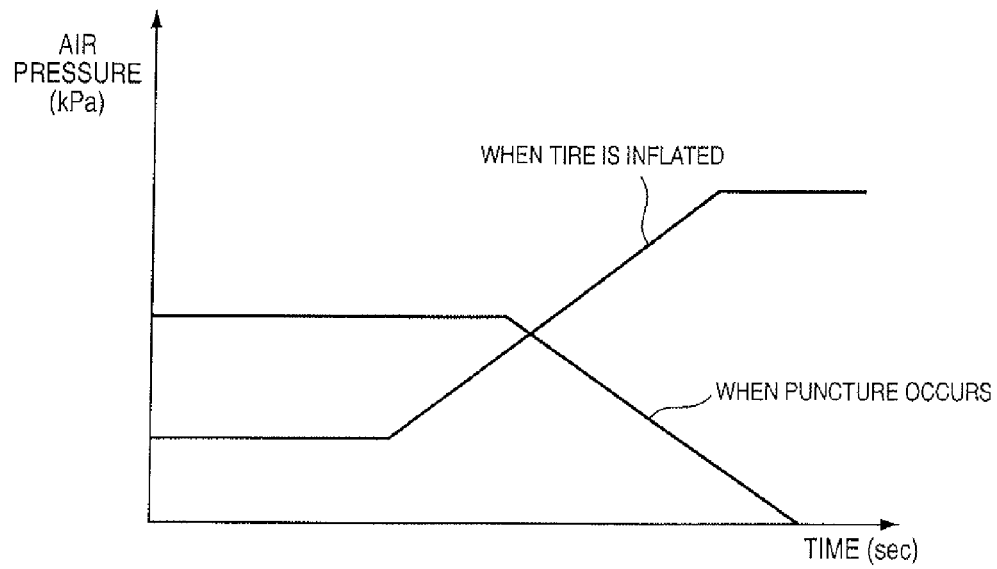
F I G. 31
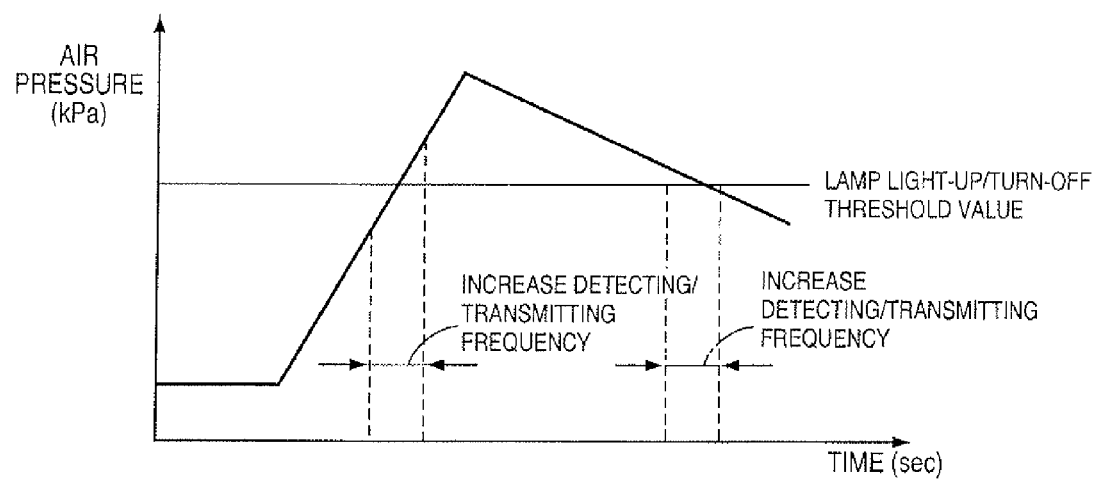
F I G. 32

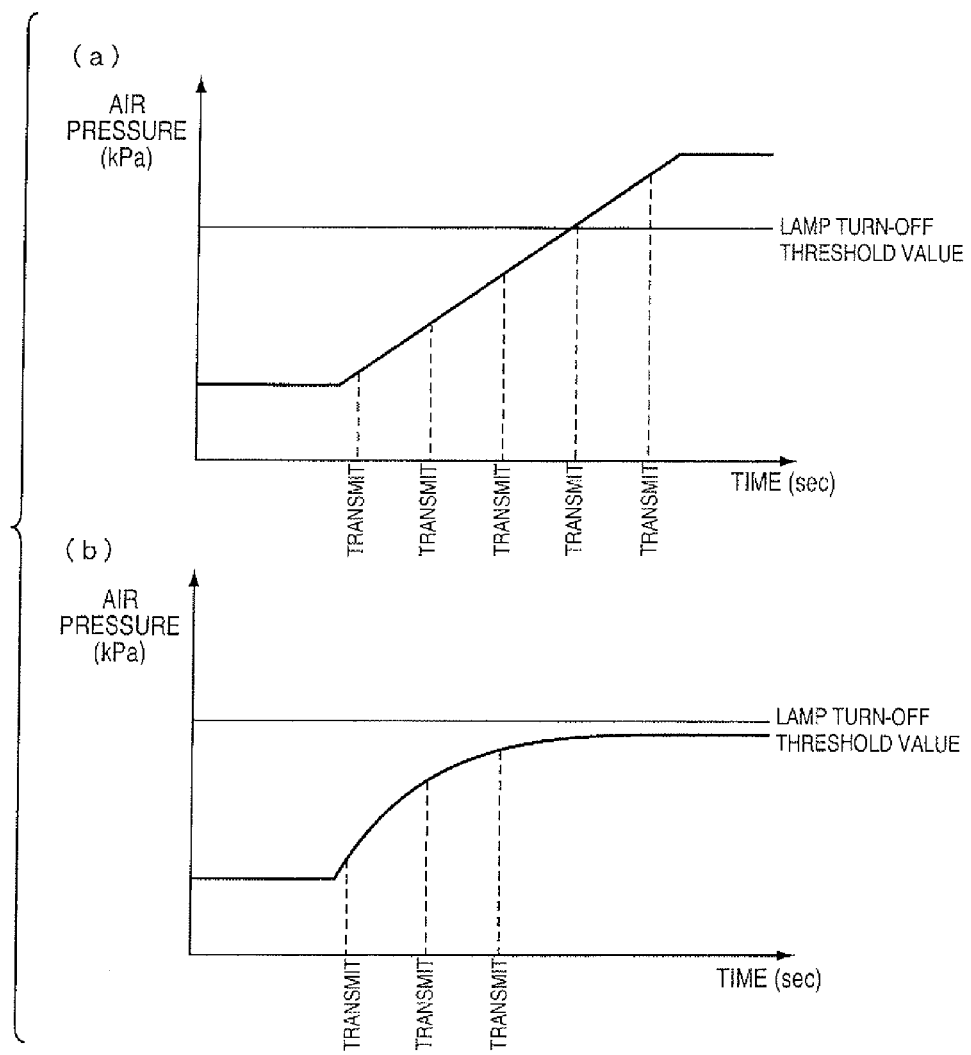
F I G. 33

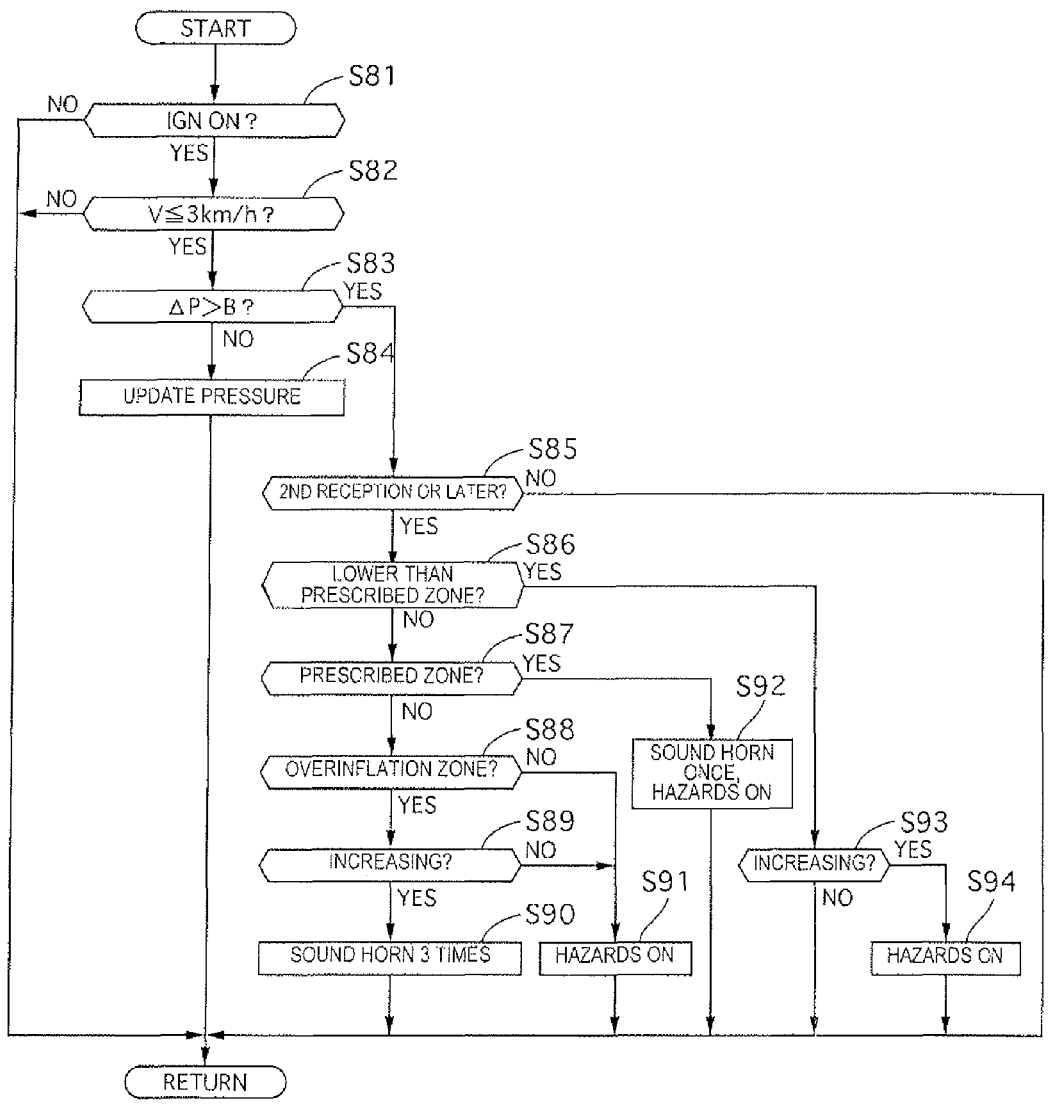
F I G. 34

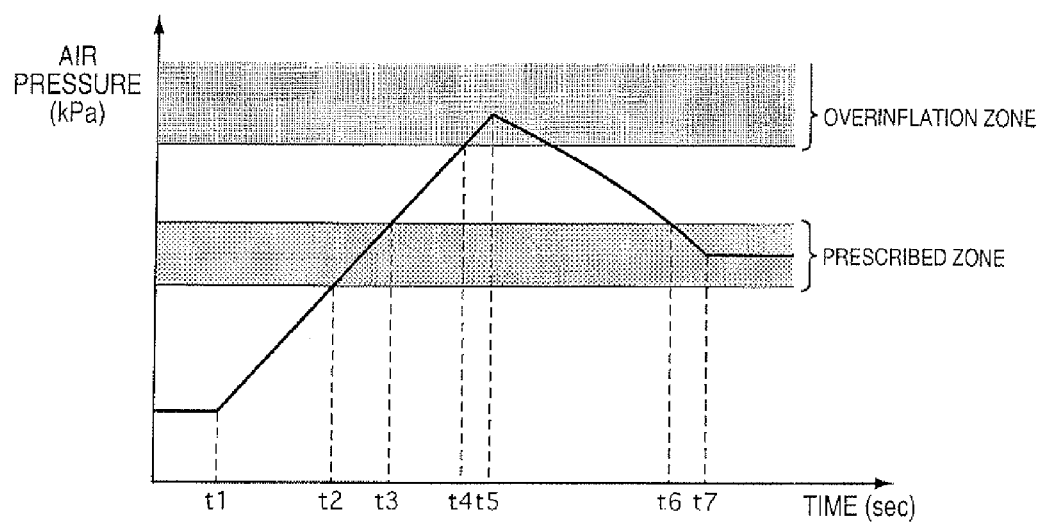
F I G. 35

TIRE AIR PRESSURE DETECTING DEVICE, TIRE AIR PRESSURE MONITORING SYSTEM, AND TIRE AIR PRESSURE NOTIFICATION METHOD

CROSS-REFERENCE TO RELATED APPLICATIONS

This application is a U.S. National stage of International Application No. PCT/IB2010/001512, filed Jun. 23, 2010, which claims priority to Japanese Patent Application No. 2009-162982, filed on Jul. 9, 2009. The entire disclosure of Japanese Patent Application No. 2009-162982 is hereby incorporated herein by reference.

BACKGROUND

1. Field of the Invention

The present invention relates to a tire air pressure detecting device, a tire air pressure monitoring system, and a tire air pressure transmission method.

2. Background Information

In tire air pressure detecting devices employed in conventional systems for monitoring tire air pressure, limits are placed on the frequency of use of the transmitter with the goal of reducing power consumption. For example, according to the technique disclosed in Japanese Patent No. 4124373, with the vehicle at a stop, the frequency of transmission of the transmitter is set to once every 15 minutes; and if the vehicle speed exceeds 25 km/h, the frequency of transmission is set to once every 54 seconds, thereby keeping transmitting frequency to the lowest limit necessary. Additionally, according to the above publication, transmission of the transmitter may be carried out only when needed through an arrangement whereby after a predetermined period of time has elapsed since the vehicle speed exceeded 25 km/h, transmitting frequency is increased regardless of current vehicle speed when a given pressure fluctuation has occurred.

SUMMARY

However, in the conventional system described above, transmitting frequency is uniquely determined by a single threshold value of vehicle speed or a single threshold value of pressure fluctuation. Thus, in order to increase the transmitting frequency when, for example, the tires are being inflated with the vehicle at a stop, it is necessary to set both of these two threshold values to fairly low values. If both threshold values have been set to low values however, transmitting frequency will be consistently high during travel, making reduced energy consumption unlikely. On the other hand, in order to increase the transmitting frequency when a tire puncture or blowout occurs during travel, it is necessary to set both of these two threshold values to fairly high values. However, if both threshold values have been set to high values, transmitting frequency will not increase when the tires are being inflated, so that air pressure cannot be ascertained properly when the tires are being inflated.

According to the present invention, the threshold value for switching transmitting frequency from a prescribed low frequency to a prescribed high frequency is set variably according to a vehicle running state and change in air pressure of the tires.

In view of the state of the known technology, a tire air pressure detecting device according to one aspect of the invention includes an air pressure detecting unit, a transmitting unit, a running state detecting unit, an air pressure change rate detecting section, and a frequency adjustment section. The air pressure detecting unit is configured and arranged to detect a tire air pressure of a tire mounted to a vehicle. The transmitting unit is configured and arranged to transmit a detected value of the tire air pressure detected by the air pressure detecting unit. The running state detecting unit is configured and arranged to detect a running state of the vehicle. The air pressure change rate detecting section is configured to detect an air pressure change rate at which the tire air pressure changes. The frequency adjustment section is configured to adjust a transmitting frequency at which the detected value of the tire air pressure detected by the air pressure detecting unit is externally transmitted by the transmitting unit according to the running state detected by the running state detecting unit and the air pressure change rate detected by the air pressure change rate detecting section. The frequency adjustment section is further configured to variably set a threshold value for switching the transmitting frequency from low frequency to high frequency according to the running state and the air pressure change rate.

According to the above configuration, optimal transmitting frequency can be attained according to the vehicle running state and the air pressure change rate, while obtaining information at the minimum necessary transmitting frequency.

BRIEF DESCRIPTION OF THE DRAWINGS

Referring now to the attached drawings which form a part of this original disclosure:

FIG. 2 is a schematic diagram showing a detailed configuration of the tire air pressure monitoring system according to the first embodiment;

FIG. 3 is a control block diagram of an application-specific integrated circuit (ASIC) in the tire air pressure monitoring system in accordance with the first embodiment;

FIG. 5 is a diagram depicting change in air pressure during tire inflation and when a tire puncture occurs;

FIG. 6 is a diagram showing the relationship between the air pressure change rate and transmitting frequency when threshold value for transmitting frequency change is fixed according to a comparative example;

FIG. 7 is a diagram showing the relationship between the air pressure change rate and transmitting frequency according to the first embodiment;

FIG. 8 is a diagram showing the difference in the air pressure change rate observed between change in air pressure during tire inflation and change in air pressure due to the influences of temperature or the like;

FIG. 9 is a diagram showing change in air pressure during tire inflation and during rough road travel;

FIG. 12 is a flowchart depicting the flow of the air pressure transmission control process according to the second embodiment;

FIG. 13 is a flowchart depicting the flow of the air pressure transmission control process executed by a tire air pressure monitoring system according to a third embodiment of the present invention;

FIG. 14 is a flowchart depicting the flow of the air pressure transmission control process according to the third embodiment;

FIG. 22 is a diagram depicting a method of setting a change rate threshold value correction quantity according to elapsed time after the vehicle comes to a stop in a tire air pressure monitoring system according to a fifth embodiment of the present invention;

FIG. 25 is a flowchart depicting the flow of the air pressure transmission control process executed by a tire air pressure monitoring system according to a seventh embodiment;

FIG. 26 is a flowchart depicting the flow of the air pressure transmission control process according to the seventh embodiment;

FIG. 29 is a timing chart depicting a method of setting air pressure detecting frequency and transmitting frequency according to the relationship of two lamp turnoff threshold values and air pressure during tire inflation in a tire air pressure monitoring system according to a modified example of the seventh embodiment of the present invention;

FIG. 30 is a diagram depicting change in air pressure when a tire puncture occurs during travel, and change in air pressure associated with travel;

FIG. 31 is a diagram depicting change in air pressure when a tire puncture occurs with the vehicle stopped, and change in air pressure observed during tire inflation by the user;

FIG. 32 is a diagram depicting change in air pressure during tire inflation by the user;

FIG. 33 includes a diagram (a) depicting change in air pressure when the inflation procedure is carried out by the user with an inflation tool having good performance; and a diagram (b) depicting change in air pressure when the inflation procedure is carried out by the user with an inflation tool having poor performance according to a tenth embodiment of the present invention;

FIG. 34 is a flowchart depicting the flow of the air pressure transmission control process executed by a tire air pressure monitoring system according to an eleventh embodiment of the present invention; and FIG. 35 is a timing chart depicting change in air pressure during tire inflation according to the eleventh embodiment.

DETAILED DESCRIPTION OF EMBODIMENTS

Selected embodiments of the tire air pressure detecting device, the tire air pressure monitoring system, and the tire air pressure notification method will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Referring initially to FIGS. 1 to 9, a tire air pressure monitoring system including a tire air pressure detecting device is illustrated in accordance with a first embodiment.

Figure 1:
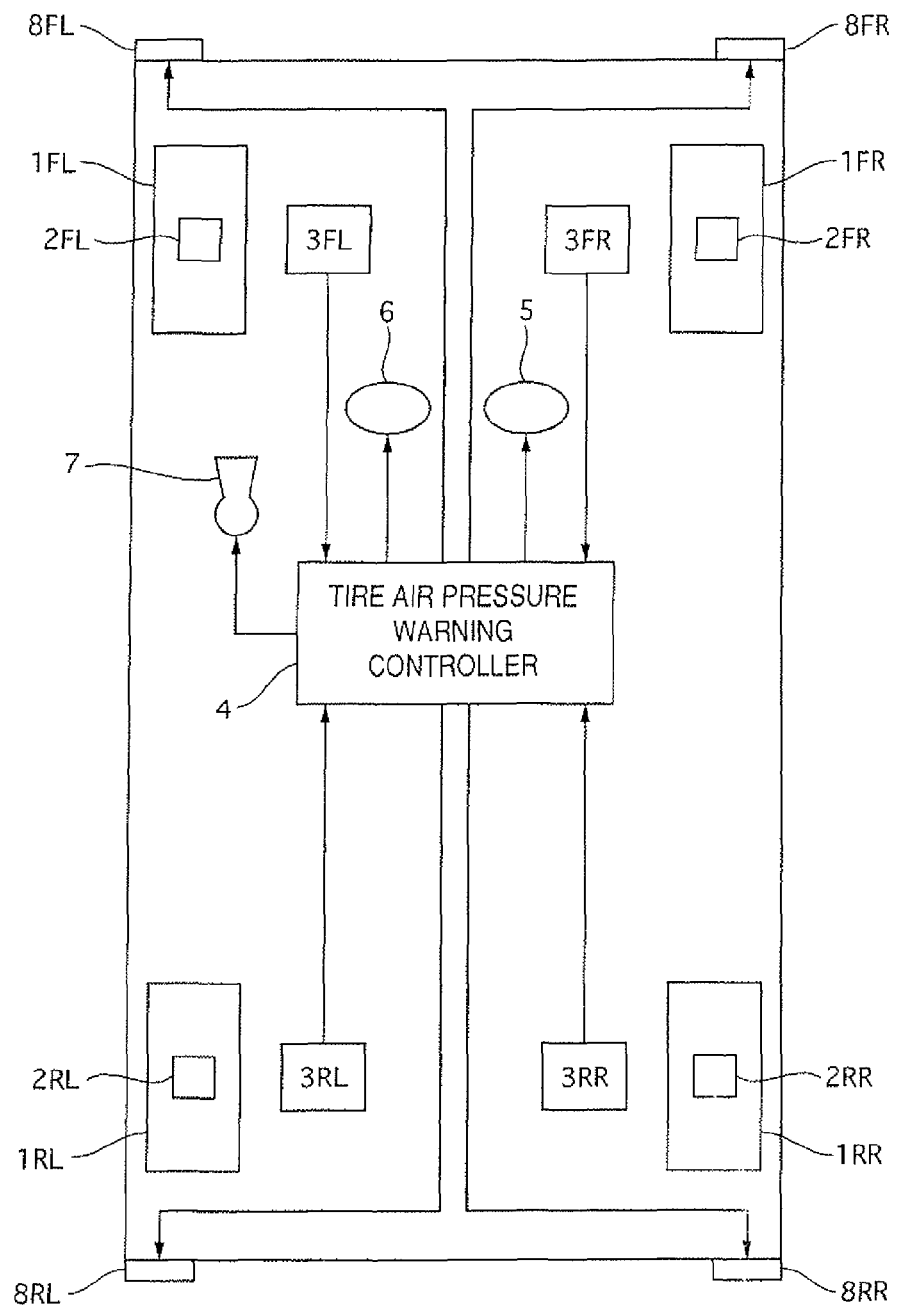
FIG. 1 is a schematic diagram showing an overall configuration of a vehicle provided with a tire air pressure monitoring system according to a first embodiment of the present invention.

FIG. 1 is a schematic diagram showing an overall configuration of a vehicle in which the tire air pressure monitoring system of the first embodiment is implemented. The vehicle of the first embodiment includes a plurality of tires 1FL, 1FR, 1RL and 1RR respectively coupled to a plurality of wheels; a plurality of tire air pressure detecting devices 2FL, 2FR, 2RL and 2RR; a plurality of antenna-equipped tuners (receivers) 3FL, 3FR, 3RL and 3RR; a tire air pressure warning controller 4; a display 5; a warning lamp (indicating unit) 6, a horn (alerting unit) 7, and a plurality of turn signals (alerting unit) 8FL, 8FR, 8RL and 8RR. In the above symbols, FL denotes the front left wheel, FR donates the front right wheel, RL donates the rear left wheel, and RR donates the rear right wheel. Also, where parts are referred to collectively or one of the parts is referred on behalf of all the parts, these suffixes are omitted (e.g. the tire air pressure detecting devices 2FL, 2FR, 2RL and 2RR would be collectively donated as the tire air pressure detecting devices 2, or any of the tire air pressure detecting devices 2FL, 2FR, 2RL and 2RR would be denoted as the tire air pressure detecting device 2 to represent all of the tire air pressure detecting devices 2FL, 2FR, 2RL and 2RR).

The tire air pressure detecting devices 2 are respectively attached to the wheels (preferably at a rim of the wheel) of the corresponding tires 1, and configured and arranged to detect the air pressure of each individual tire, as well as to transmit wireless signals that indicate individual tire ID (tire identification codes), sensed air pressure information, and so on to the corresponding antenna-equipped tuners 3.

A single transmission from one of the tire air pressure detecting devices 2 contains a plurality of items of outgoing data transmitted at irregular transmission intervals, for example. More specifically, a single transmission might include as transmitted information a start bit, a function code, an ID, air pressure information, and a checksum transmitted within a period of 15.3 msec, for example.

The antenna-equipped tuners 3 are configured and arranged to receive the information transmitted from the tire air pressure detecting devices 2 and to input it to the tire air pressure warning controller 4.

The tire air pressure warning controller 4 is configured to register the individual ID of each tire and to display on the display 5 the air pressure information for the front and rear wheel tires 1FL, 1FR, 1RL and 1RR that are identified through registration of their IDs. In the event of a determination that abnormal air pressure has occurred in one or more of the front and rear wheel tires 1FL, 1FR, 1RL and 1RR, the tire air pressure warning controller 4 is configured to output a lamp light-up command to the low pressure warning lamp 6. Abnormal air pressure refers to a situation in which air pressure lies outside the predetermined correct range. The lamp light-up command continues until air pressure is brought into the predetermined correct range. Registration of individual tire IDs preferably takes place only when a tire or tires are replaced.

FIG. 2 is a schematic diagram showing a detailed configuration of the tire air pressure monitoring system of the first embodiment.

Each of the tire air pressure detecting devices 2 has a pressure sensor 10*a* (an example of the air pressure detecting unit), a centrifugal switch 10*b* (an example of the running state detecting unit), an application-specific integrated circuit (ASIC) 10*c*, a transmitter element 10*d*, and a transmitting antenna 10*e* (an example of the transmitting unit).

The pressure sensor 10*a* is configured and arranged to detect the pressure of a corresponding one of the tires 1 and to output it to the ASIC 10*c*.

The centrifugal switch 10*b* is a switch that is open (OFF) when centrifugal force acting upon it is weak, and closed (ON) when centrifugal force acting upon it is strong. In the first embodiment, the centrifugal switch 10*b* is designed to output an open signal when the vehicle is at a stop (including times of travel at very low speed, e.g. speeds of 5 km/h or less) and to output a closed signal during travel (e.g., in excess of 5 km/h). That is, the centrifugal switch 10*b* is configured and arranged to detect a travel speed (running state) of the vehicle by determining whether the vehicle is traveling in excess of speeds of 5 km/h or not, and from the open/closed signal thereof it can be determined whether the vehicle is traveling (in a high-speed travel state) or at a stop (in a low-speed travel state). The centrifugal switch 10*b* is configured and arranged to output its open/closed signal to the corresponding ASIC 10*c*.

The ASIC 10*c* is an application-specific integrated circuit that is configured to, based on air pressure detected by the pressure sensor 10*a* and the open/closed signal from the centrifugal switch 10*b*, generate outgoing data that includes tire air pressure information, to establish a transmitting frequency for the outgoing data, and to output this outgoing data and transmitting frequency to the transmitter element 10*d*. The ASIC 10*c* will be described in detail later. The transmitter element 10*d* is configured and arranged to transmit the outgoing data from the transmitting antenna 10*e* according to the transmitting frequency established by the ASIC 10*c*. Each of the antenna-equipped tuners 3 has a receiving antenna 11*a* for receiving the outgoing data from the tire air pressure detecting device 2, and a tuner 11*b* constituting the reception circuit.

In the first embodiment, the tire air pressure warning controller 4 has a 5V power circuit 4*a*; a microcomputer 4*b* that inputs received data from the tuners 11*b* and that carries out various kinds of data processing thereof; an EEPROM 4*c* which is a memory from which saved information is electrically erasable, and which is used for ID registration; a display driver circuit 4*d* for outputting to the display 5 a display driving command to display air pressure information for the tires 1FL, 1FR, 1RL and 1RR based on the received data; a warning lamp output circuit 4*e* for determining from the received data the pressure values of the installed tires, and outputting a tire air pressure warning command to the low pressure warning lamp 6 in the event of low pressure; an output circuit 4*f* for outputting to the horn 7 an audible alarm command according to the air pressure during tire inflation; and a display driver circuit 4*g* for outputting to the turn signals 8 a blinking command according to the air pressure during tire inflation.

FIG. 3 is a control block diagram of the ASIC 10*c* in the first embodiment. The ASIC 10*c* preferably includes a microcomputer and other conventional components such as an input interface circuit, an output interface circuit, and memory blocks such as a ROM (Read Only Memory) device and a RAM (Random Access Memory) device. The ASIC 10*c* has an air pressure change rate detecting module (air pressure change rate detecting section) 21 and a frequency adjustment module (frequency adjustment section) 22. The air pressure change rate detecting module 21 is configured to detect change per unit time of the air pressure measured by the pressure sensors 10*a*, i.e., the air pressure change rate. The frequency adjustment module 22 is configured to repeatedly execute in a prescribed cycle the control program shown in FIG. 4 (as described in detail below) based on the vehicle speed detected by the centrifugal switch 10*b* and the air pressure change rate detected by the air pressure change rate detecting module 21 in order to achieve the optimal transmitting frequency according to a vehicle running state and a air pressure change rate according to the first embodiment.

Air Pressure Transmission Control Process

Figure 4:
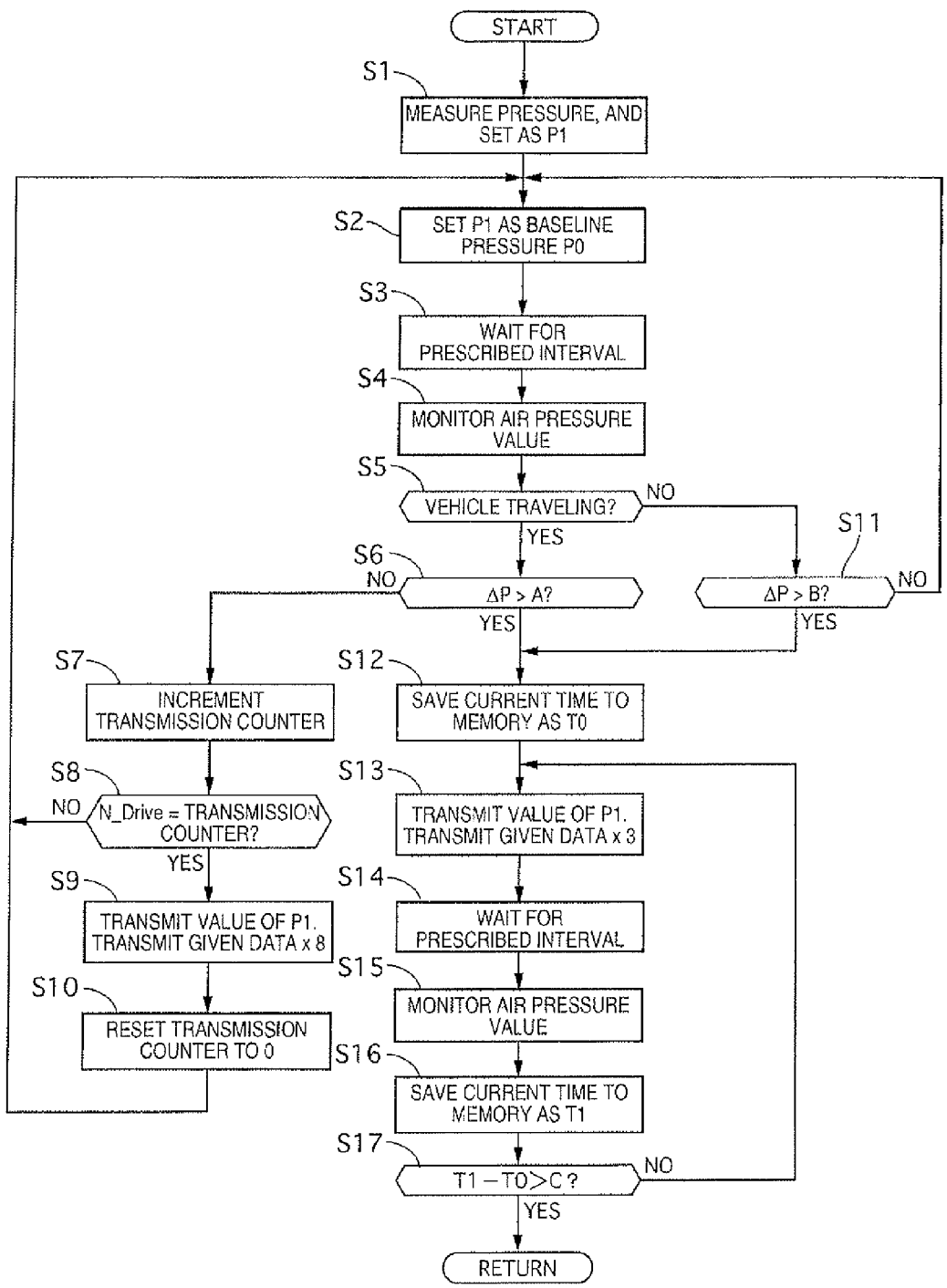
FIG. 4 is a flowchart depicting the flow of the air pressure transmission control process executed by the tire air pressure monitoring system in accordance with the first embodiment.

FIG. 4 is a flowchart depicting the control algorithm for the air pressure transmission control process executed by each of the tire air pressure detecting devices 2 of the tire air pressure monitoring system according to the first embodiment. The flowchart of FIG. 4 is initiated by reception of an external trigger signal when the vehicle is shipped from the factory, and is repeated until battery life of a battery provided in the tire air pressure detecting device 2 is exhausted.

In Step S1, the pressure sensor 10*a* is configured and arranged to measure the air pressure of the corresponding tire 1, and the ASIC 10*c* is configured to set the measured air pressure as the pressure P1 and to store the pressure P1 in memory. Then, the routine advances to Step S2.

In Step S2, the ASIC 10*c* is configured to set the pressure P1 stored in memory as the baseline pressure P0, and store the baseline pressure P0 in memory. Then, the routine advances to Step S3.

In Step S3, the ASIC 10*c* is configured to wait for a prescribed time interval to elapse. After the prescribed time interval has elapsed, the routine proceeds to Step S4. In the first embodiment, the prescribed time interval in step S3 is preferably set to 30 seconds.

In Step S4, the ASIC 10c is configured to monitor the air pressure value. More specifically, in this step, the pressure sensor 10a is configured and arranged to measure the pressure of the corresponding tire 1 again, and the ASIC 10c is configured to set the measured pressure as the pressure P1 and to store the pressure P1 in memory. Then, the routine advances to Step S5.

In Step S5, according to whether the centrifugal switch 10b is ON, the ASIC 10c is configured to determine whether the vehicle has started traveling. If the determination in step S5 is YES, the routine advances to Step S6. If the determination in step S5 is NO, the routine advances to Step S11.

In Step S6, the ASIC 10c is configured to determine whether an air pressure change rate $\Delta P$ exceeds a change rate threshold value A. The air pressure change rate $\Delta P$ is obtained as an absolute value of the difference $|P1-P0|$ between P1 that was set in Step S4 and the baseline pressure P0 that was set in Step S2 per unit time used in step S3 (30 seconds). In other words, the air pressure change rate $\Delta P$ is obtained by the equation $|P1-P0|/30$. Here, the change rate threshold value A is a value that falls within a prescribed pressure fluctuation range during travel, but greater than the change in air pressure predicted to occur during rough road travel. In the first embodiment, the change rate threshold value A is set to $40/30 \approx 1.33$ kPa/s.

If the determination in step S6 is YES, then the routine advances to Step S12. If the determination in step S6 is NO, the routine advances to Step S7.

In Step S7, the transmission counter is incremented (+1), and the routine advances to Step S8.

In Step S8, the ASIC 10c is configured to determine whether the value of the transmission counter equals a predetermined value N_Drive. If the determination in step S8 is YES, then the routine advances to Step S9. If the determination in step S8 is NO, then the routine returns to Step S2. Here, the predetermined value N_Drive is a positive natural number equal to 2 or greater. In the first embodiment, the predetermined value N_Drive is set to 2.

In Step S9, the ASIC 10c is configured to transmit the value of the pressure P1 to the tire air pressure warning controller 4 via the corresponding antenna-equipped tuner 3. Then, the routine proceeds to Step S10. Here, eight identical transmission data are preferably transmitted. Given transmission data are transmitted in multiple numbers so that the data will be more reliably received by the antenna-equipped tuner 3.

In Step S10, the ASIC 10c is configured to reset the transmission counter to 0, and then the routine returns to Step S2.

Referring back to step S5, when the determination in step S5 is No, then the routine proceeds to step S11. In Step S11, the ASIC 10c is configured to determine whether the air pressure change rate $\Delta P$ exceeds a change threshold value B. Here, the change rate threshold value B is a value that falls within a predetermined pressure fluctuation range when the vehicle is stopped, but is less than the maximum change in air pressure predicted to occur when the user increases the air pressure (when the user inflates the tire). Accordingly, the change rate threshold value B is a smaller value than the change threshold value A. In the first embodiment, the change rate threshold value B is set to $10/30 \approx 0.33$ kPa/s.

If the determination in step S11 is YES, then the routine advances to Step S12. If the determination in step S11 is NO, then the routine returns to Step S2.

In Step S12, the ASIC 10c is configured to save the current time in memory as the time T0, and then the routine advances to Step S13.

In Step S13, the ASIC 10c is configured to transmit the value of pressure P1 to the tire air pressure warning controller 4 via the corresponding antenna-equipped tuner 3. Then, the routine proceeds to Step S14. Here, three identical transmission data are preferably transmitted. Given transmission data are transmitted in multiple numbers so that the data will be more reliably received by the antenna-equipped tuner 3. When the transmission data is transmitted in step S9 as described above, the tire air pressure is considered to be in a normal state since it has been determined that the air pressure change rate $\Delta P$ is not greater than the change rate threshold value A in step S6. In such a case, the transmitting frequency is relatively low (30×2=60-second interval), and thus, the identical transmission data is transmitted eight times. On the other hand, when the transmission data is transmitted in step S13, the tire air pressure is considered to be in an abnormal state since it has been determined that the air pressure change rate $\Delta P$ is greater than the change rate threshold value A in step S6 or that the air pressure change rate $\Delta P$ is greater than the change rate threshold value B in step S6. Therefore, it is desirable to transmit the tire air pressure data in a real-time manner with a shorter transmitting frequency. Since the transmitting frequency is increased, the number of the identical data transmitted at the same transmission timing in step S13 can be smaller (e.g., 3). Of course, it will be apparent to those skilled in the art from this disclosure that the actual numbers of the transmitted data in steps S9, S13 and the corresponding steps in the following embodiments are not limited to the numbers disclosed herein.

When the determination in step S6 is YES, it means that the tire pressure might be abnormal. When the determination in step S11 is YES, it means the tire pressure might be abnormal or the tire is being inflated by the user. Therefore, after the transmission data is transmitted to the tire air pressure warning controller 4 in step S13, the tire air pressure warning controller 4 is configured to illuminate the warning lamp 6 to alert the user that a problem has occurred if the warning lamp 6 has not already been illuminated. If the warning lamp 6 has already been illuminated, that means the tire might be being inflated. Therefore, in such a case, the tire air pressure warning controller 4 is configured to turn off the warning lamp 6 at an appropriate timing (e.g., when the tire air pressure reaches the prescribed correct range of pressure).

In Step S14, the ASIC 10c is configured to wait for a prescribed time interval to elapse. After the prescribed time interval has elapsed, the routine proceeds to Step S15. Here, the prescribed time interval is preferably set to 10 seconds.

In Step S15, the ASIC 10c is configured to monitor the air pressure value. More specifically, the pressure sensor 10a is configured to measure the air pressure of the tire 1, and the ASIC 10c is configured to set the measured pressure as the pressure P1 and to store the pressure P1 in memory, whereupon the routine then advances to Step S16.

In Step S16, the ASIC 10c is configured to save the current time in memory as the time T1, and then, the routine advances to Step S17.

In Step S17, the ASIC 10c is configured to determine as to whether the difference between the time T1 that was saved in Step S16 and the time T0 that was saved in Step S12 exceeds a predetermined time period C. If the determination in step S17 is YES, then the routine advances to RETURN, and the control flow shown in FIG. 4 is repeated. If the determination in step S17 is NO, then the routine returns to Step S13. In the first embodiment, the predetermined time period C is preferably set to 30 minutes.

Change Rate Threshold Value Switching Operation

In a tire air pressure monitoring system, situations necessitating increased frequency of detecting and transmitting the air pressure; i.e., increased accuracy of detecting air pressure for the user, include: 1) when the user is increasing the air pressure (when the user is inflating the tire); 2) when a tire puncture or blowout has occurred; and 3) when there has been an appreciable drop in tire air pressure.

As shown in FIG. 5, the air pressure change rate observed during inflation of the tire by the user is smaller than the air pressure change rate when a tire puncture or blowout has occurred. That is, because the magnitude of change in air pressure of which the user must be alerted will differ during travel versus when the vehicle is stopped, if a constant non-variable change rate threshold value for switching the transmitting frequency (transmission rate) from low to high with reference to the air pressure change rate is employed, the following trade-offs will occur.

For example, if the change rate threshold value has been set to within the pressure fluctuation range observed with the vehicle stopped in order to increase transmitting frequency during tire inflation, as indicated by the dash-dot line in FIG. 6, it will frequently occur that the transmitting frequency switches from low to high when the vehicle is traveling due to air pressure fluctuations associated with rough road travel or the like, resulting in unnecessary power consumption by the transmitter. On the other hand, if the change rate threshold value has been set to within the pressure fluctuation range observed during travel in order to limit unnecessary switching of transmitting frequency, as shown by the solid line in FIG. 6, when the user inflates the tire and air pressure is increased while the vehicle is at a stop (when it is desirable to boost the transmitting frequency) it will not be possible to increase the transmitting frequency, making it impossible for the user to be accurately apprised of conditions of gradually changing air pressure.

According to the first embodiment on the other hand, as mentioned previously, focusing on the fact that the level of change in air pressure at which it becomes necessary to notify the user differs according to the vehicle running state (stopped or traveling), the change rate threshold value A (1.33 kPa/s) during travel is set to be greater than the change rate threshold value B (0.33 kPa/s) with the vehicle stopped. In other words, in the first embodiment, the threshold value is variable to be one of the change rate threshold value A and the change rate threshold value B depending on the vehicle running state and the air pressure change rate.

Specifically, in the flowchart of FIG. 4, if in Step S5 it is determined that the vehicle is travelling, the system advances to Step S6, whereupon the air pressure change rate ΔP and the change rate threshold value A are compared. If ΔP≤A, the transmitting frequency remains unchanged at the low frequency of 60-second (30×2) intervals (1/60 Hz) (i.e., the prescribed time interval of 30 seconds elapses in step S3 and the routine is repeated twice by the transmission counter in steps S7 and 8). On the other hand, if ΔP>A, the transmitting frequency is switched from the low frequency of 60-second intervals to a high frequency of 10-second intervals (0.1 Hz) (i.e., the prescribed time interval of 10 seconds elapses in step S14).

Meanwhile, if in Step S5 it is determined that the vehicle is stopped, the system advances to Step S11, whereupon the air pressure change rate ΔP and the change rate threshold value B (<A) are compared. If ΔP>B, the transmitting frequency is switched from the low frequency of 60-second intervals to the high frequency of 10-second intervals. On the other hand, if ΔP≤B, transmission is suspended.

FIG. 7 is a diagram showing the relationship between air pressure change rate (pressure change) and transmitting frequency in the first embodiment. During travel the threshold value for switching the transmitting frequency is set to the change rate threshold value A, and thus, unnecessarily high transmitting frequency due to air pressure fluctuations associated with rough road travel can be avoided. When the vehicle is stopped, the threshold value is set to the change rate threshold value B, and thus, the air pressure detecting accuracy can be increased when the user increases the air pressure (when the user inflates the tire). That is, optimized transmitting frequency according to the vehicle running state (traveling or being stopped) and the air pressure change rate ΔP can be achieved, and the required information can be obtained at the lowest transmitting frequency necessary.

In the first embodiment, if it is determined in Step S5 that the vehicle is stopped, and it is further determined in Step S11 that ΔP≤B, wireless signal transmission is suspended. Specifically, since tire punctures or appreciable drops in air pressure do not normally occur when the vehicle is stopped, if the air pressure change rate ΔP is equal to or less than the change rate threshold value B, i.e. if inflation by the user is not detected, transmission of wireless signals can be suspended in order to reduce energy loss with the vehicle at a stop.

In the first embodiment, when the predetermined time period C (e.g., 30 minutes) have elapsed in Step S17 after switching the transmitting frequency from 60-second intervals to O-second intervals due to a sudden change in air pressure detected in step S6 or S11, transmitting frequency then returns to 60-second intervals. If transmitting frequency were to be maintained at 10-second intervals indefinitely subsequent to a sudden change in the air pressure, the energy loss would be considerable. In consideration of the time it takes for a user to inflate the tires, by maintaining transmitting frequency at 10-second intervals for a predetermined time period C (e.g., 30 minutes) following a sudden pressure change, and then returning the transmitting frequency to 60-second intervals after the predetermined time period C (e.g., 30 minutes) have passed, energy loss can be minimized, and the user can be more promptly notified of the outcome of the increasing of the air pressure. Moreover, because the duration of sudden pressure change when a tire puncture or blowout has occurred is on the order of several minutes, a 30-minute duration time, for example, for maintaining transmitting frequency at 10-second intervals affords ample time to monitor for punctures and associated drops in air pressure.

According to the first embodiment, the transmitting frequency is switched based on the outcome of comparison of the air pressure change rate ΔP with the change rate threshold value A or B. If, for example, the fluctuation range of air pressure (air pressure variation) were to be used instead of the air pressure change rate, if the pressure fluctuation ranges of changes in air pressure due to an increase in the air pressure (or a decrease in the air pressure by a tire puncture) and of changes in air pressure associated with travel or temperature changes happen to be about the same as depicted in FIG. 8, it will not be possible to distinguish between the two. Consequently, transmitting frequency will frequently become elevated due to travel and temperature changes, resulting in considerable energy losses.

According to the first embodiment on the other hand, because the transmitting frequency is switched based on the air pressure change rate ΔP, changes in air pressure due to inflation or a puncture can be distinguished from changes in air pressure associated with travel or temperature changes, so energy losses can be limited.

According to the first embodiment, during travel the change rate threshold value A is set to a value (1.33 kPa/s) that is greater than the maximum air pressure change rate predicted to occur during rough road travel; and when the vehicle is stopped the change rate threshold value B is set to a value (0.33 kPa/s) that is smaller than the predicted air pressure change rate when the user increases the air pressure. As shown in FIG. 9, the air pressure change rate during rough road travel is sometimes higher than the air pressure change rate during tire inflation. Thus, during travel, by setting the change rate threshold value A to a greater value than the air pressure change rate during rough road travel, it is possible to avoid unnecessarily high transmitting frequency during rough road travel. Meanwhile, because fluctuations in air pressure exceeding the air pressure change rate during tire inflation do not occur with the vehicle at a stop, by setting the change rate threshold value B to a smaller value than the air pressure change rate during tire inflation, the transmitting frequency can be increased while inflation is taking place, so that the user may be frequently notified of the air pressure.

According to the first embodiment, during travel, the air pressure detecting frequency (30-second intervals as counted in step S3) is shorter than the transmitting frequency (60-second intervals). This is because if the detecting frequency were matched with the transmitting frequency (60-second intervals), performance would be degraded due to delayed timing of detecting the air pressure; whereas if, conversely, the transmitting frequency were matched with the detecting frequency (30-second intervals), there would be considerable energy loss. That is, by making the detecting frequency shorter than the transmitting frequency, it is possible to both minimize energy losses and ensure good performance. If the air pressure change rate ΔP exceeds the change rate threshold value (A or B); that is, if the air pressure change rate ΔP exceeds the change rate threshold value during travel, or if the air pressure change rate ΔP exceeds the change rate threshold value B with the vehicle stopped, the detecting frequency and the transmitting frequency are both brought into synchronization at 10-second intervals, thus avoiding energy losses resulting from mismatched timing of the detecting frequency and the transmitting frequency.

The tire air pressure monitoring system of the first embodiment affords the following exemplary effects.

(1) The system is provided with the pressure sensors 10a for detecting tire air pressure; the transmitter elements 10d and the transmitting antennas 10e for transmitting tire air pressure sensor values; the centrifugal switches 10b for detecting the running state of the vehicle; the air pressure change rate detecting modules 21 for detecting air pressure change rate ΔP of the tires; and the frequency adjustment modules 22 for adjusting the transmitting frequency of tire air pressure sensor values according to the vehicle running state detected by the centrifugal switches 10b and the air pressure change rate ΔP detected by the air pressure change rate detecting modules 21. The frequency adjustment modules 22 set, in a variable manner, the change rate threshold values A, B for switching the transmitting frequency from low frequency to high frequency according to the vehicle running state and the air pressure change rate ΔP. This makes it possible to achieve optimal transmitting frequency according to the vehicle running state and the air pressure change rate ΔP, while obtaining required information at the minimum necessary transmitting frequency.

(2) Because the detection results by the centrifugal switches 10h are used to set the change rate threshold values A, B so that the transmitting frequency increases according to the vehicle travel state (or travel speed), transmitting frequency can be switched from low frequency to high frequency according to the vehicle travel state (or travel speed), even if the air pressure change rate stays constant.

(3) Because the frequency adjustment modules 22 set the change rate threshold values A, B so that the transmitting frequency increases according to the air pressure change rate, transmitting frequency can be switched from low frequency to high frequency according to the air pressure change, even if the vehicle running state, for example the travel speed, stay constant.

(4) Because the frequency adjustment modules 22 make the change rate threshold value B with the vehicle stopped (or the low speed travel state) smaller than the change rate threshold value A during travel (or the high speed travel state), it is possible both to avoid unnecessary increases in transmitting frequency during travel, and to improve detecting accuracy during tire inflation.

(5) Because the frequency adjustment modules 22, after switching the transmitting frequency from low frequency (60-second intervals) to high frequency (10-second intervals) according to the air pressure change rate ΔP, subsequently maintain high frequency (10-second intervals) until the end of a predetermined continuous time interval (e.g., 30 minutes), it is possible both to reduce energy losses and to improve detecting accuracy during tire inflation.

(6) Because the frequency adjustment modules 22 suspend transmission of transmission data if the air pressure change rate ΔP is equal to or less than the change rate threshold value B with the vehicle stopped, energy loss while the vehicle is stopped can be reduced.

(7) In a tire air pressure monitoring system in the pressure sensor 10a is attached to each of the tires 1 to transmit tire air pressure to the antenna-equipped tuner 3 mounted to the vehicle-side (as opposed to the wheel-side), and the received air pressure values are presented to the occupant, the tire air pressure detecting device 2 is configured and arranged as described above. A tire air pressure monitoring system affording both reduced energy loss and improved detecting accuracy is thereby afforded.

(8) In the tire air pressure detecting device 2 attached to each of the tires 1 and adapted to transmit tire air pressure detected by the pressure sensor 10a to the antenna-equipped tuner 3 situated on the vehicle-side, the threshold value for switching the transmitting frequency from low frequency to high frequency is set in a variable manner based on the detected running state of the vehicle and the air pressure change rate. Thus, optimal transmitting frequency can be attained according to the vehicle running state and the air pressure change rate ΔP, while obtaining required information at the minimum necessary transmitting frequency.

(9) In a tire air pressure transmission method for transmitting tire air pressure detected on the wheel side to the vehicle-side, the air pressure change rate ΔP is determined, the vehicle running state is detected, and the threshold value for switching the transmitting frequency from low frequency to high frequency is set in a variable manner based on the detected running state of the vehicle and the tire air pressure change rate. It is thereby possible to obtain optimal transmitting frequency according to the vehicle running state and the air pressure change rate ΔP, while obtaining required information at the minimum necessary transmitting frequency.

It will be apparent to those skilled in the art from this disclosure that the actual values (intervals) of the transmitting frequency and detecting frequency in the first embodiment and the following embodiments are not limited to the values disclosed herein. For example, in the first embodiment, the transmitting frequency and detecting frequency can be changed by appropriately setting the prescribed intervals used in steps S3 and S14, and the predetermined value N-Drive (counter) used in step S8.

Second Embodiment

Figure 10:
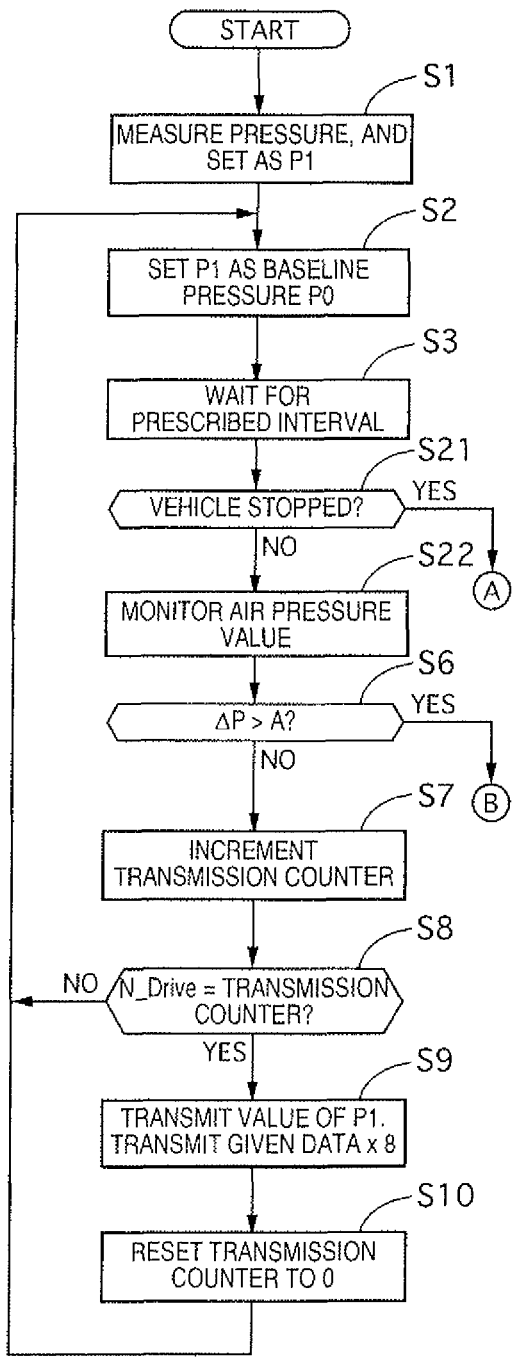
FIG. 10 is a flowchart depicting the flow of the air pressure transmission control process executed by a tire air pressure monitoring system according to a second embodiment of the present invention.
Figure 11:
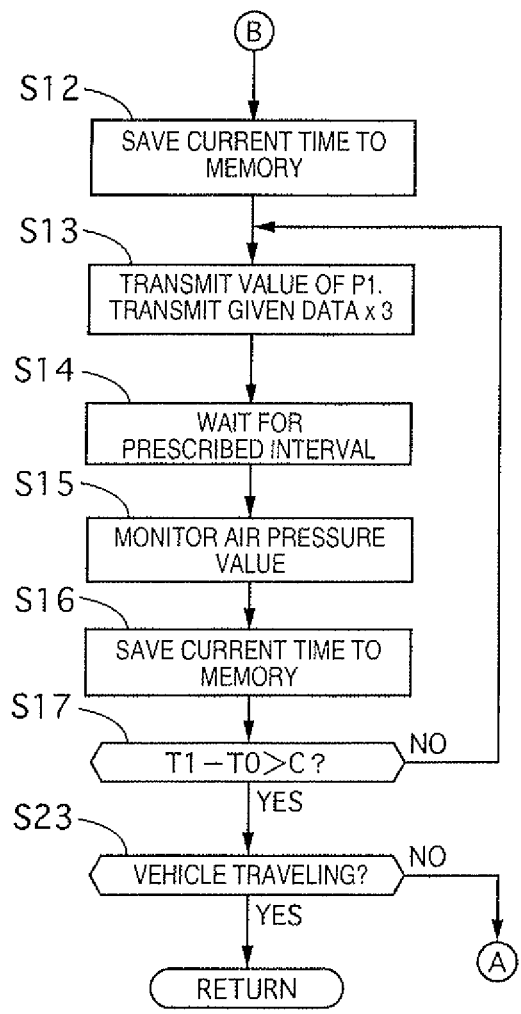
FIG. 11 is a flowchart depicting the flow of the air pressure transmission control process according to the second embodiment.

Referring now to FIGS. 10 to 12, a tire air pressure detecting device, a tire air pressure monitoring system, and a tire air pressure notification method in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The tire air pressure monitoring system of the second embodiment differs from the tire air pressure monitoring system of the first embodiment in that the detecting frequency and the transmitting frequency of the tire air pressure when the vehicle is at a stop can be set to shorter (higher) frequencies than the detecting frequency and the transmitting frequency when the vehicle is traveling.

The physical structures of the tire air pressure monitoring system of the second embodiment is identical to the physical structures of the tire air pressure monitoring system of the first embodiment as illustrated in FIGS. 1 to 3, and thus, the description thereof is omitted for the sake of brevity.

Air Pressure Transmission Control Process

FIGS. 10, 11, and 12 depict the control algorithm executed by each of the tire air pressure detecting devices 2 in the second embodiment. Steps for carrying out processes identical to those of the first embodiment depicted in FIG. 4 have been assigned like step symbols and are not described.

In Step S21 shown in FIG. 10, according to whether the centrifugal switch 10b is OFF, the ASIC 10c is configured to determine whether the vehicle is stopped. If the determination in step S21 is YES, then the routine advances to Step S24 shown in FIG. 12. If the determination in step S21 is NO, the routine advances to Step S22.

In Step S22, the pressure sensor 10a is configured and arranged to measure the air pressure of the tire 1, and the ASIC 10c is configured to set the measured pressure as the pressure P1 and to store the pressure P1 in memory. Then, the routine advances to Step S6.

In Step S23 shown in FIG. 11, according to whether the centrifugal switch 10b is ON, the ASIC 10c is configured to determine whether the vehicle is being driven. If the determination in step S23 is YES, then the routine advances to RETURN and the control flow depicted in FIGS. 10 to 12 is repeated. If the determination in step S23 is NO, then the routine advances to Step S24 shown in FIG. 12.

In Step S24, the pressure sensor 10a is configured and arranged to measure the air pressure of the tire 1, and the ASIC 10c is configured to set the measured pressure as the pressure P1 and to store the pressure P1 in memory. Then, the routine, advances to Step S25.

In Step S25, the ASIC 10c is configured to set the pressure P1 in memory as the baseline pressure P0, and to store the baseline pressure P0 in memory. Then, the routine advances to Step S26.

In Step S26, the ASIC 10c is configured to wait for a prescribed time interval to elapse. After the prescribed time interval has elapsed, the routine proceeds to Step S27. Here, the prescribed time interval is preferably set to 15 seconds.

In Step S27, the ASIC 10c is configured to transmit the value of pressure P1 to the tire air pressure warning controller 4 via the corresponding antenna-equipped tuner 3. Then, the routine proceeds to Step S28. Here, three identical transmission data are preferably transmitted.

In Step S28, according to whether the centrifugal switch 10b is ON, the ASIC 10c is configured to determine whether the vehicle has started to travel (i.e., whether the vehicle is traveling). If the determination in step S28 is YES, then the routine advances to RETURN and the control flow depicted in FIGS. 10 to 12 is repeated. If the determination in step S28 is NO, then the routine advances to Step S29.

In Step S29, the pressure sensor 10a is configured and arranged to measure the air pressure of the tire 1, and the ASIC 10c is configured to set the measured pressure as the pressure P1 and to store the pressure P1 in memory. Then, the routine advances to Step S30.

In Step S30, a determination is made as to whether the air pressure change rate $\Delta P$ is greater than the change rate threshold value B. As in the first embodiment, the air pressure change rate $\Delta P$ is obtained as an absolute value of the difference $|P1-P0|$ between P1 that was set in Step S29 and the baseline pressure P0 that was set in Step S25 per unit time used in step S26 (15 seconds). In other words, the air pressure change rate $\Delta P$ is obtained by the equation $|P1-P0|/15$. The change rate threshold value B used in step S30 is the same as the change rate threshold value B used in step S11 of the first embodiment. If the determination in step S30 is YES, then the routine advances to Step S12 shown in FIG. 11. If the determination in step S30 is NO, then the routine returns to Step S25.

When the determination in step S30 is YES, it means the tire pressure might be abnormal or the tire might be being inflated by the user. Therefore, after the transmission data is transmitted to the tire air pressure warning controller 4 in step S13, the tire air pressure warning controller 4 is configured to illuminate the warning lamp 6 to alert the user that a problem has occurred if the warning lamp 6 has not already been illuminated. If the warning lamp 6 has already been illuminated, that means the tire might be being inflated. Therefore, in such a case, the tire air pressure warning controller 4 is configured to turn off the warning lamp 6 at an appropriate timing (e.g., when the tire air pressure reaches the prescribed correct range of pressure).

Next, the operation will be described.

In the second embodiment, during travel, when the air pressure change rate $\Delta P$ is equal to or less than the change rate threshold value A, the flow repeatedly advances through Step S2→Step S3→Step S21→Step S22→Step S6→Step S7→Step S8→Step S9→Step S10, and the air pressure detecting frequency is set to 30 seconds (in step S3) while the transmitting frequency is set to 60-seconds (30×2) as in the first embodiment. During travel, when the air pressure change rate $\Delta P$ exceeds the change rate threshold value A, the flow repeatedly advances through Step S12→Step S13→Step S14→Step S15→Step S16→Step S17, and the tire air pressure detecting frequency and the transmitting frequency are both set to 10-second intervals until the predetermined time period C (e.g., 30 minutes) has passed as in the first embodiment.

On the other hand, with the vehicle stopped, when the air pressure change rate $\Delta P$ is equal to or less than the change rate threshold value B, the flow repeatedly advances through Step S25→Step S26→Step S27→Step S28→Step S29→Step S30, and the tire air pressure detecting frequency and the transmitting frequency are both set to 15-second intervals (1/15 Hz). With the vehicle stopped, when the air pressure change rate $\Delta P$ exceeds the change rate threshold value B, the tire air pressure detecting frequency and the transmitting frequency are both set to 10-second intervals until the predetermined time period C (e.g., 30 minutes) has passed, in the same manner as during travel.

In the second embodiment, there have been separately provided a process taking place during travel (Steps S22, S6 to S10 and Steps S12 to S23) and a process taking place with the vehicle stopped (Steps S24 to S29), thereby allowing different detecting and transmitting frequencies to be established. More specifically, a 30-second interval for detecting frequency and a 60-second interval for transmitting frequency are established during travel when the air pressure change rate $\Delta P$ is equal to or less than the change rate threshold value A, while a 15-second interval for both detecting frequency and transmitting frequency is established with the vehicle stopped when the air pressure change rate $\Delta P$ is equal to or less than the change rate threshold value B.

The purpose of detecting the air pressure change rate differs during travel versus when the vehicle is at a stop. During travel, the aim is to notify the user if a puncture occurs, whereas with the vehicle at a stop it is to notify the user of changing air pressure occurring with inflation. When inflation is started by the user, it is preferable for the user to be presented more promptly with the outcome of the inflation. By setting the detecting frequency and transmitting frequency with the vehicle stopped to a shorter frequency than the detecting frequency and transmitting frequency during travel, the system can promptly perceive when tire inflation by the user is initiated, and the user can more promptly be apprised of the outcome of inflation.

The effects will now be described.

The tire air pressure monitoring system of the second embodiment affords the following effect in addition to effects (1) to (5) and (7) to (9) of the first embodiment.

(10) Because the frequency adjustment modules 22 set the transmitting frequency (15-second intervals) when the air pressure change rate $\Delta P$ is equal to or less than the change rate threshold value B when the vehicle is stopped to a higher frequency than the transmitting frequency (60-second intervals) when the air pressure change rate $\Delta P$ is equal to or less than the change rate threshold value A during travel, the user can be more promptly notified of air pressure when carrying out inflation with the vehicle stopped.

Alternatively, in the second embodiment, Step S27 in FIG. 12 may be omitted so that transmission is suspended when the vehicle is stopped and when the air pressure change rate $\Delta P$ is equal to or less than the change rate threshold value B as in the first embodiment. In such a case, energy loss while the vehicle is stopped can be reduced by suspending transmission of the transmission data.

Third Embodiment

Referring now to FIGS. 10 and 13-17, a tire air pressure detecting device, a tire air pressure monitoring system, and a tire air pressure notification method in accordance with a third embodiment will now be explained. In view of the similarity between the first, second and third embodiments, the parts of the third embodiment that are identical to the parts of the first or second embodiment will be given the same reference numerals as the parts of the first or second embodiment. Moreover, the descriptions of the parts of the third embodiment that are identical to the parts of the first or second embodiment may be omitted for the sake of brevity.

The third embodiment differs from the second embodiment in that the period of time, over which the higher transmitting frequency is maintained after a sudden pressure change has occurred, differs during travel versus when the vehicle is stopped in the third embodiment.

The physical structures of the tire air pressure monitoring system of the third embodiment is identical to the physical structures of the tire air pressure monitoring system of the first embodiment as illustrated in FIGS. 1 to 3, and thus, the description thereof is omitted for the sake of brevity.

Air Pressure Transmission Control Process

FIGS. 10, 13, 14, and 15 depict the control algorithm executed by each of the tire air pressure detecting devices 2 in the third embodiment. Only those portions that differ from the second embodiment are described.

In Step S31 shown in FIG. 13, the ASIC 10c is configured to determine whether the difference between the time T1 that was saved in Step S16 and the time T0 that was saved in Step S12 exceeds a predetermined time period C1 (e.g., 5 minutes). If the determination in step S31 is YES, then the routine advances to Step S23. If the determination in step S31 is NO, then the routine returns to Step S13.

In Step S32 shown in FIG. 14, the ASIC 10c is configured to determine whether the air pressure change rate $\Delta P$ exceeds the change rate threshold value B. As in the first and second embodiments, the air pressure change rate $\Delta P$ is obtained as an absolute value of the difference |P1−P0| between P1 that was set in Step S29 and the baseline pressure P0 that was set in Step S25 per unit time used in step S26 (15 seconds). In other words, the air pressure change rate $\Delta P$ is obtained by the equation |P1 P0|/15. The change rate threshold value B used in step S32 is the same as the change rate threshold value B used in step S11 of the first embodiment. If the determination in step S32 is YES, then the routine advances to Step S33 shown in FIG. 15. If the determination in step S32 is NO, the routine returns to Step S25.

When the determination in step S32 is YES, it means the tire air pressure might be abnormal or the tire might be being inflated by the user. Therefore, after the transmission data is transmitted to the tire air pressure warning controller 4 in step S34 (described later), the tire air pressure warning controller 4 is configured to illuminate the warning lamp 6 to alert the user that a problem has occurred if the warning lamp 6 has not already been illuminated. If the warning lamp 6 has already been illuminated, that means the tire might be being inflated. Therefore, in such a case, the tire air pressure warning controller 4 is configured to turn off the warning lamp 6 at an appropriate timing (e.g., when the tire air pressure reaches the prescribed correct range of pressure). In the third embodiment, if the ignition switch is turned OFF while the warning lamp 6 is illuminated, the warning lamp 6 will be extinguished when air pressure that is acquired after the next time that the ignition switch is turned ON has exceeded a threshold value for extinguishing the warning lamp 6.

Figure 15:
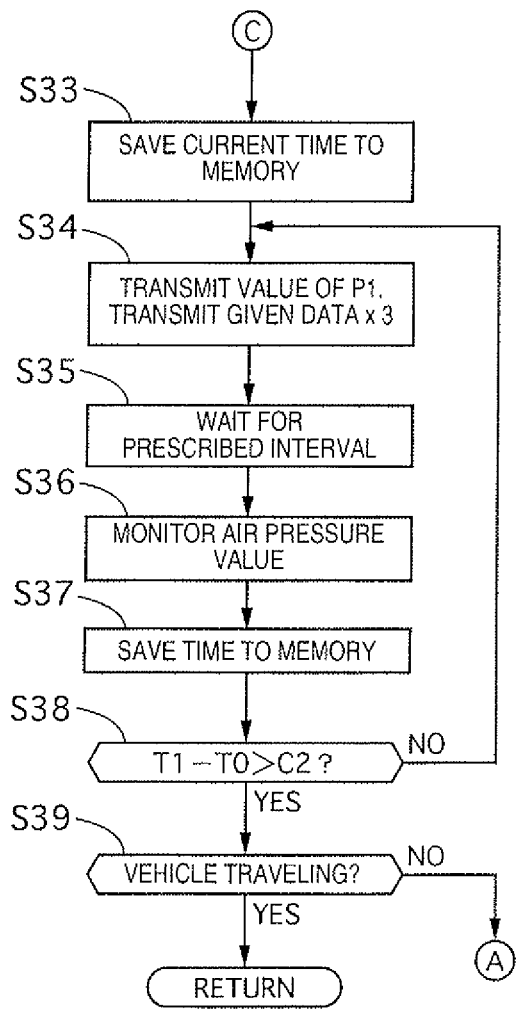
FIG. 15 is a flowchart depicting the flow of the air pressure transmission control process according to the third embodiment.

In Step S33 shown in FIG. 15, the ASIC 10c is configured to save the current time in memory as T0, and then, the routine advances to Step S34.

In Step S34, the ASIC 10c is configured to transmit the value of pressure P1 to the tire air pressure warning controller 4 via the corresponding antenna-equipped tuner 3. Then, the routine proceeds to Step S35. Here, three identical transmission data are preferably transmitted. Given transmission data are transmitted in multiple numbers so that the data will be more reliably received by the antenna-equipped tuner 3.

In Step S35, the ASIC 10c is configured to wait for a prescribed time interval to elapse. After the prescribed time interval has elapsed, the routine proceeds to Step S36. Here, the prescribed time interval is preferably set to 10 seconds.

In Step S36, the ASIC 10c is configured to monitor the air pressure value. More specifically, the pressure sensor 10a is configured to measure the air pressure of the tire 1, and the ASIC 10c is configured to set the measured pressure as the pressure P1 and to store the pressure P1 in memory, whereupon the routine then advances to Step S37.

In Step S37, the ASIC 10c is configured to save the current time in memory as the time T1, and then, the routine advances to Step S38.

In Step S38, the ASIC 10c is configured to determine as to whether the difference between the time T1 that was saved in Step S37 and the time T0 that was saved in Step S33 exceeds a predetermined time period C2 (30 min). If the determination in step S38 is YES, then the routine advances to Step S39. If the determination in step S38 is NO, then the routine advances to Step S34.

In Step S39, according to whether the centrifugal switch 10b is ON, the ASIC 10c is configured to determine whether the vehicle is being driven. If the determination in step S39 is YES, then the routine advances to RETURN and the control flow depicted in FIGS. 10, 13, 14 and 15 is repeated. If the determination in step S39 is NO, then the routine advances to Step S24 shown in FIG. 14.

Next, the operation will be described.

In the third embodiment, when the air pressure change rate ΔP exceeds the change rate threshold value A during travel, the transmitting frequency switches from 60-second (30×2) intervals to 10-second intervals. Subsequently after the prescribed time period C1 (e.g., 5 minutes) have passed, the transmitting frequency returns from 10-second intervals to 60-second intervals.

Figure 16:
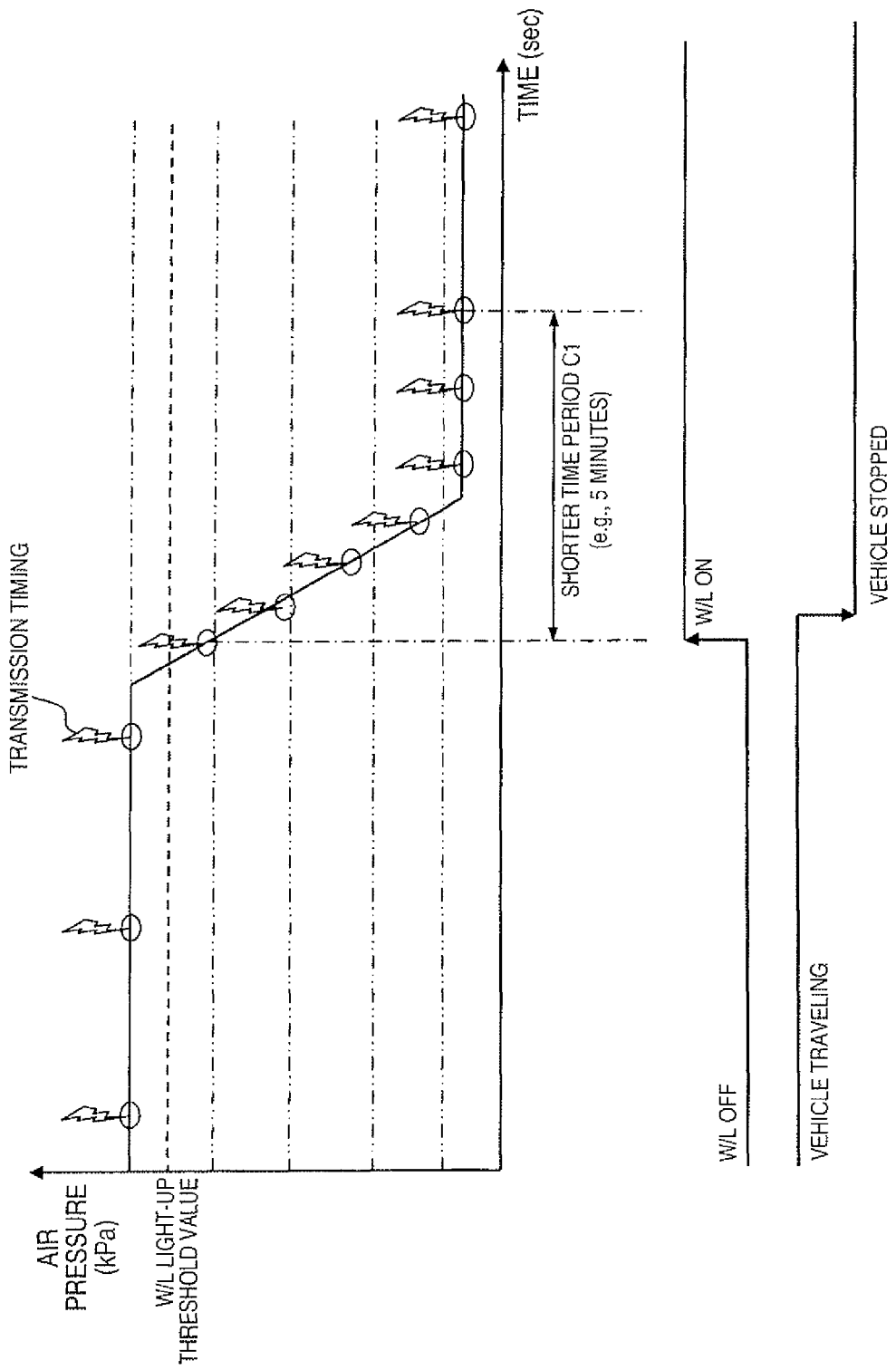
FIG. 16 includes a timing chart illustrating an example of air pressure, transmitting frequency, and a command signal transmitted to a warning lamp when a tire puncture occurs according to the third embodiment.

FIG. 16 is a timing chart showing air pressure and transmitting frequency when a tire puncture occurs. When a tire puncture occurs during travel, because the ignition switch is ON, once the puncture is detected (e.g., when it is detected that the tire air pressure falls below a threshold value for lighting up the warning lamp) the warning lamp 6 can be illuminated immediately to warn the user of that a tire puncture has occurred, regardless of whether the user has brought the vehicle to a stop as shown in FIG. 16 or continues to drive after the tire puncture. That is, when a puncture occurs, it is not necessary for high transmitting frequency to be maintained for an extended period. Thus, by establishing a shorter time period C1 (e.g., 5 minutes) for increasing the frequency of air pressure detecting and transmission in the event of a sudden change in air pressure during travel, energy losses can be reduced.

Meanwhile, in the third embodiment, the transmitting frequency with the vehicle stopped is shorter, i.e. 15-second intervals, than the transmitting frequency of 60-second interval during travel. When the air pressure change rate ΔP exceeds the change rate threshold value B with the vehicle stopped, the transmitting frequency when with vehicle stopped switches from 15-second interval to 10-second intervals. Subsequently, after the prescribed time period C2 (e.g., 30 minutes) have passed, the transmitting frequency returns from 10-second intervals to 15-second interval.

Figure 17:
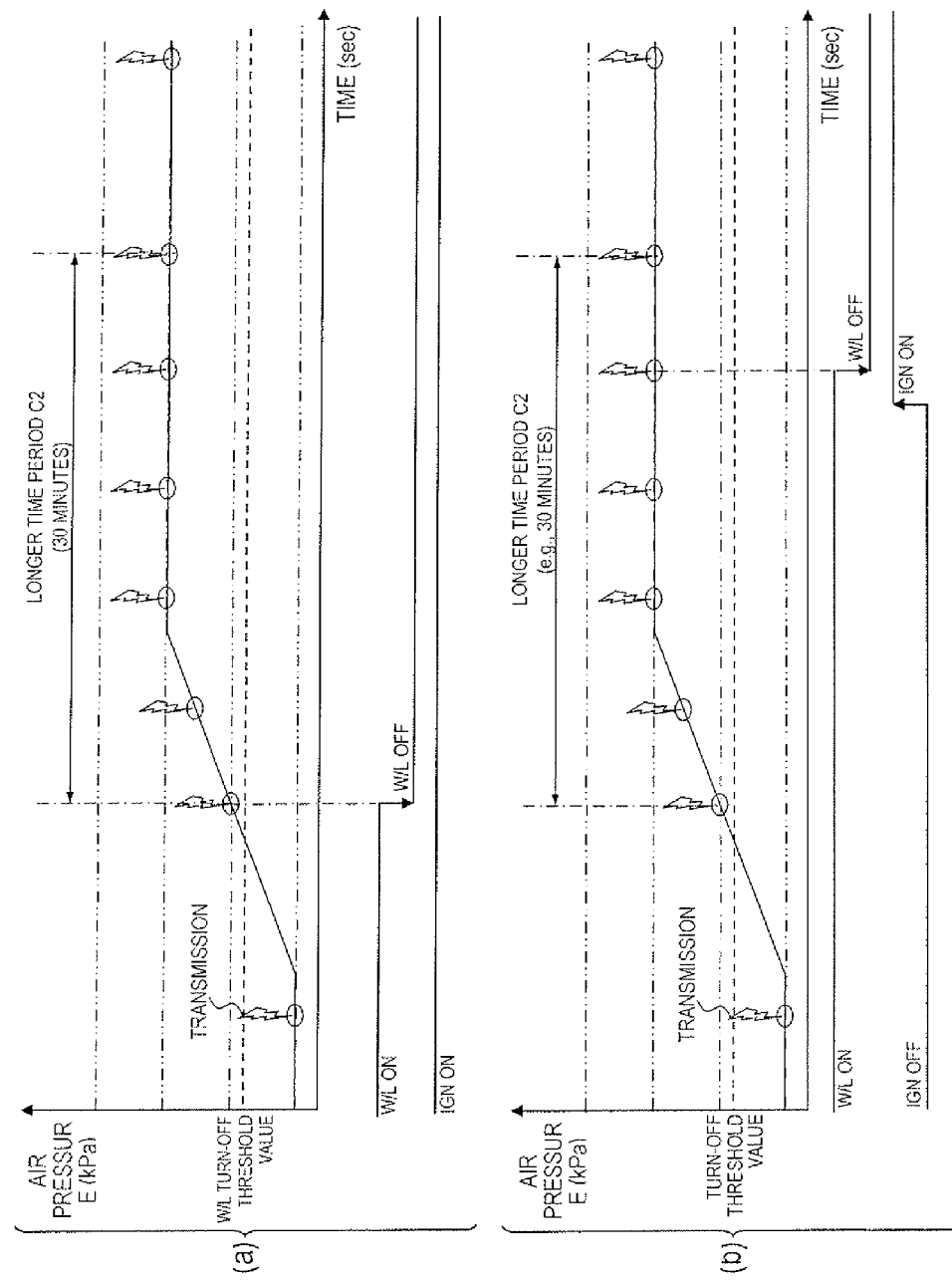
FIG. 17 includes a diagram (a) with a timing chart illustrating air pressure, transmitting frequency, and a command signal transmitted to a warning lamp when the user inflates the tire while the ignition switch is ON, and a diagram (b) with a timing chart illustrating air pressure, transmitting frequency, and a command signal transmitted to a warning lamp when the user starts inflating the tire when the ignition switch is OFF and then subsequently turns the ignition switch ON according to the third embodiment.

FIG. 17 (a) is a timing chart illustrating air pressure and transmitting frequency during tire inflation and a command signal transmitted to a warning lamp when the user inflates the tire while the ignition switch is ON. Prior to this time chart shown in FIG. 17 (a) takes place, the warning lamp is turned on by detecting a drop in a tire air pressure during travel due to a tire puncture or the like as shown in FIG. 16. Then, according to the third embodiment, if the ignition switch is maintained ON while the user subsequently inflates the tire, the warning lamp 6 is extinguished when it is detected that the air pressure exceeds a turn-off threshold value for extinguishing the warning lamp 6 as shown in FIG. 17 (a).

On the other hand, if the user carries out tire inflation with the ignition switch being turned OFF, because the tire air pressure warning controller 4 is not operating, it cannot notify the user of the air pressure transmitted by the tire air pressure detecting devices 2. More specifically, if the ignition switch is turned OFF after the warning lamp is turned on by detecting a drop in tire air pressure during travel due to a tire puncture or the like, the functioning of the tire air pressure warning controller 4 will be interrupted in a condition in which it is still outputting a lamp light-up command. Thus, if the user has carried out tire inflation with the ignition switch being turned OFF as shown in FIG. 17 (b), the warning lamp 6 will remain illuminated in response to the lamp light-up command when the ignition switch is next turned ON, despite the air pressure being in the proper range. The air pressure acquired by the air pressure warning controller 4 immediately after the ignition switch is turned ON will have a value above the turn-off threshold value. Therefore, according to the third embodiment, by maintaining the increased transmitting frequency (e.g., 10-second interval) for an extended period of time (e.g., 30 minutes) when the sudden pressure change is detected while the vehicle is stopped, the warning lamp 6 can be extinguished relatively quickly after the ignition switch is turned ON as shown in FIG. 17 (b), if the ignition switch is turned ON within the extended period of time (e.g., 30 minutes).

As noted in the first embodiment as well, because the time needed for the user to carry out the inflation procedure is uncertain, by establishing an extended period (e.g., 30 minutes) for increased transmitting frequency, even if the user has carried out tire inflation with the ignition switch OFF, the user can be promptly notified of the air pressure the next time that the ignition switch is turned ON.

The effects will now be described.

The tire air pressure monitoring system of the third embodiment affords the following effect in addition to effects (1) to (5) and (7) to (9) of the first embodiment and effect (10) of the second embodiment.

(11) Energy losses can be reduced because the frequency adjustment modules 22 set the duration (e.g., 5 minutes) of increased transmitting frequency when switching from low transmitting frequency (60-second intervals) to high transmitting frequency (10-second intervals) during travel shorter than the duration (e.g., 30 minutes) of increased transmitting frequency (10-second intervals) when the vehicle is stopped.

Alternatively, in the third embodiment, Step S27 in FIG. 14 may be omitted so that transmission is suspended when the vehicle is stopped and when the air pressure change rate ΔP is equal to or less than the change rate threshold value B or D as in the first embodiment. In such a case, energy loss while the vehicle is stopped can be reduced by suspending transmission of the transmission data.

Fourth Embodiment

Referring now to FIGS. 10 and 18 to 21, a tire air pressure detecting device, a tire air pressure monitoring system, and a tire air pressure notification method in accordance with a fourth embodiment will now be explained. In view of the similarity between the previous embodiments and the fourth embodiments, the parts of the fourth embodiment that are identical to the parts of the previous embodiments will be given the same reference numerals as the parts of the previous embodiments. Moreover, the descriptions of the parts of the fourth embodiment that are identical to the parts of the previous embodiments may be omitted for the sake of brevity.

The forth embodiment differs from the third embodiment in that the change rate threshold value used before a prescribed time period has elapsed after stopping the vehicle is different from the change rate threshold value used after the prescribed time period has elapsed after stopping the vehicle.

The physical structures of the tire air pressure monitoring system of the fourth embodiment is identical to the physical structures of the tire air pressure monitoring system of the first embodiment as illustrated in FIGS. 1 to 3, and thus, the description thereof is omitted for the sake of brevity.

Air Pressure Transmission Control Process

FIGS. 10, 15, 18, 19, and 20 depict the control algorithm executed by each of the tire air pressure detecting devices 2 in the fourth embodiment. Only those portions that differ from the third embodiment are described.

Figure 18:
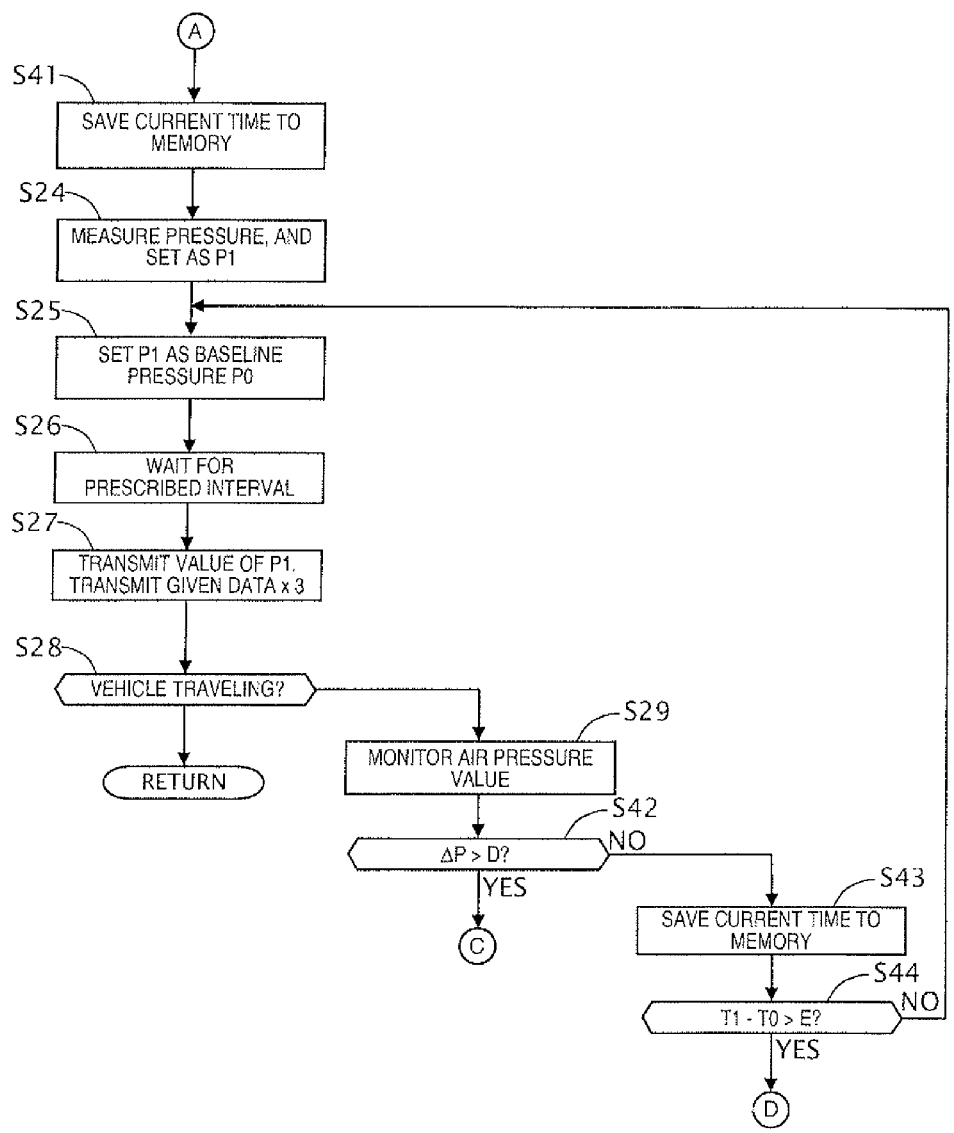
FIG. 18 is a flowchart depicting the flow of the air pressure transmission control process executed by a tire air pressure monitoring system according to a fourth embodiment of the present invention.

In Step S41 shown in FIG. 18, the ASIC 10c is configured to save the current time in memory as the time T0, and then the routine advances to Step S24.

In Step S42 shown in FIG. 18, the ASIC 10c is configured to determine whether the air pressure change rate ΔP exceeds a predetermined change rate threshold value D. Here, the change rate threshold value D is a value greater than the change rate threshold value B. In this instance, the change rate threshold value D is 14/15≈0.93 kPa/s. As in the previous embodiments, the air pressure change rate ΔP is obtained as an absolute value of the difference |P1−P0| between P1 that was set in Step S29 and the baseline pressure P0 that was set in Step S25 per unit time used in step S26 (15 seconds). In other words, the air pressure change rate ΔP is obtained by the equation |P1−P0|/15. If the determination in step S42 is YES, then the routine advances to Step S33 shown in FIG. 15. If the determination in step S42 is NO, the routine advances to Step S43.

In Step S43, the ASIC 10c is configured to save the current time in memory as the time T1, and then the routine advances to Step S44.

In Step S44, the ASIC 10c is configured to determine whether the difference between the time T1 that was saved in Step S43 and the time T0 that was saved in Step S41 exceeds a predetermined time period E. If the determination in step S44 is YES, then the routine advances to Step S45 shown in FIG. 19. If the determination in step S44 is NO, then the routine returns to Step S25. In the fourth embodiment, the predetermined time period E is preferably set to 60 minutes.

In Step S45 shown in FIG. 10, the pressure sensor 10a is configured and arranged to measure the air pressure of the corresponding tire 1, and the ASIC 10c is configured to set the measured air pressure as the pressure P1 and to store the pressure P1 in memory. Then, the routine advances to Step S46.

In Step S46, the ASIC 10c is configured to set the pressure P1 stored in memory as the baseline pressure P0, and store the baseline pressure P0 in memory. Then, the routine advances to Step S47.

In Step S47, the ASIC 10c is configured to wait for a prescribed time interval to elapse. After the prescribed time interval has elapsed, the routine proceeds to Step S48. In the fourth embodiment, the prescribed time interval in step S47 is preferably set to 15 seconds.

In step S48, the ASIC 10c is configured to transmit the value of pressure P1 to the tire air pressure warning controller 4 via the corresponding antenna-equipped tuner 3. Then, the routine proceeds to Step S49. Here, three identical transmission data are preferably transmitted.

In Step S49, according to whether the centrifugal switch 10b is ON, the ASIC 10c is configured to determine whether the vehicle is traveling. If the determination in step S49 is YES, then the routine advances to RETURN, and the control flow depicted in FIGS. 10, 15, 18, 19 and 20 is repeated. If the determination in step S49 is NO, then the routine advances to Step S50.

In Step S50, the ASIC 10c is configured to monitor the air pressure value. More specifically, in this step, the pressure sensor 10a is configured and arranged to measure the pressure of the corresponding tire 1 again, and the ASIC 10c is configured to set the measured pressure as the pressure P1 and to store the pressure P1 in memory. Then, the routine advances to Step S51.

In Step S51, the ASIC 10c is configured to determine whether the air pressure change rate ΔP exceeds the change rate threshold value B. As in the previous embodiments, the air pressure change rate ΔP is obtained as an absolute value of the difference |P1−P0| between P1 that was set in Step S50 and the baseline pressure P0 that was set in Step S46 per unit time used in step S47 (15 seconds). In other words, the air pressure change rate ΔP is obtained by the equation |P1−P0|/15. The change rate threshold value B used in step S51 is the same as the change rate threshold value B used in step S11 of the first embodiment. If the determination in step S51 is YES, then the routine advances to Step S33 shown in FIG. 15. If the determination in step S51 is NO, then the routine returns to Step S46.

If the determination in Step S51 is YES, the tire air pressure warning controller 4 illuminates the warning lamp 6 to alert the user that a problem has occurred. When the determination in step S32 is YES, it means the tire air pressure might be abnormal or the tire might be being inflated by the user. Therefore, after the transmission data is transmitted to the tire air pressure warning controller 4 in step S34 (described later), the tire air pressure warning controller 4 is configured to illuminate the warning lamp 6 to alert the user that a problem has occurred if the warning lamp 6 has not already been illuminated. If the warning lamp 6 has already been illuminated, that means the tire might be being inflated. Therefore, in such a case, the tire air pressure warning controller 4 is configured to turn off the warning lamp 6 at an appropriate timing (e.g., when the tire air pressure reaches the prescribed correct range of pressure).

Next, the operation will be described.

Figure 21:
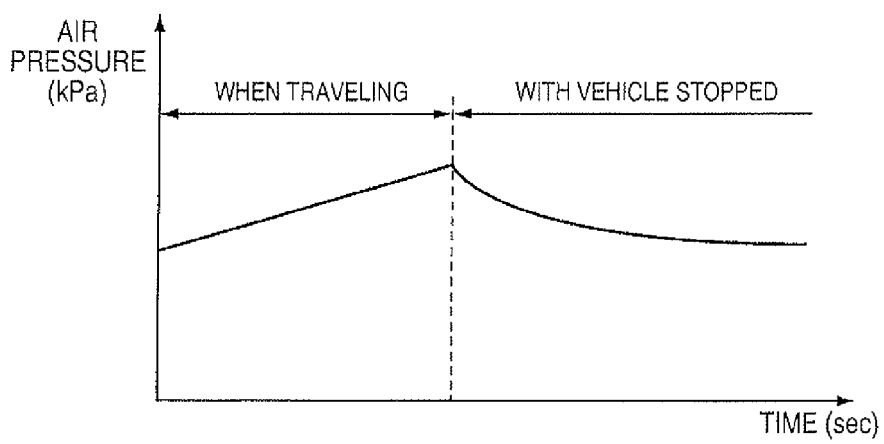
FIG. 21 is a diagram showing change in air pressure before and after a vehicle stops according to the fourth embodiment.

In the fourth embodiment, after the vehicle has stopped, until the predetermined time period E has elapsed, the change rate threshold value for comparison with the air pressure change rate ΔP is D (0.93 kPa/s) (Step S42). Thereafter, once the predetermined time period E has elapsed, the change rate threshold value switches from D to B (0.33 kPa/s) (Step S51). FIG. 21 is a timing chart showing change in air pressure after the vehicle has stopped. For some time after the vehicle is stopped, tire air pressure changes in such a way that the air pressure drops by the equivalent of the increase due to temperature change during travel, and subsequently settles down to a value depending on ambient temperature.

Thus, if after the vehicle first comes to a stop, the change rate threshold value were switched to B (0.33 kPa/s), which lies within the pressure fluctuation range with the vehicle at a stop and which is smaller than the maximum predicted value for air pressure change rate when the user increases the air pressure, there would be a risk that the air pressure change rate ΔP resulting from the drop in air pressure will exceed the change rate threshold value B, and that a false alert of abnormal air pressure will be issued. According to the fourth embodiment on the other hand, by setting the change rate threshold value to a higher value for a predetermined time period after the vehicle comes to a stop, false alerts associated with change in air pressure occurring soon after the vehicle is first stopped can be avoided.

In the description above, the change rate threshold value D employed until the predetermined time period E has elapsed after stopping the vehicle is a greater value than the change rate threshold value B. Adopting a smaller value for the change rate threshold value D than for the change rate threshold value B affords the following advantage.

In most instances, inflation performed by the user takes place within a prescribed time period after the vehicle has stopped at a gas station or the like. By setting the change rate threshold value D to a smaller value than the change rate threshold value B (e.g. to 4/15≈0.27 kPa/s), alerts can be issued more dependably during tire inflation.

The effects will now be described.

The tire air pressure monitoring system of the fourth embodiment affords the following effect in addition to effects (1) to (5) and (7) to (9) of the first embodiment, the effect (10) of the second embodiment and the effect (11) of the third embodiment.

(12) Until the end of a predetermined time period E after stopping the vehicle, the frequency adjustment modules 22 specify the change rate threshold value D different from the change rate threshold value B that is specified after the end of the predetermined time period E. Thus, if the change rate threshold value D is greater than the change rate threshold value B, false alerts associated with change in air pressure occurring after the vehicle first comes to a stop can be avoided. If the threshold value D is smaller than the change rate threshold value B, alerts can be issued more dependably during tire inflation.

Figure 19:
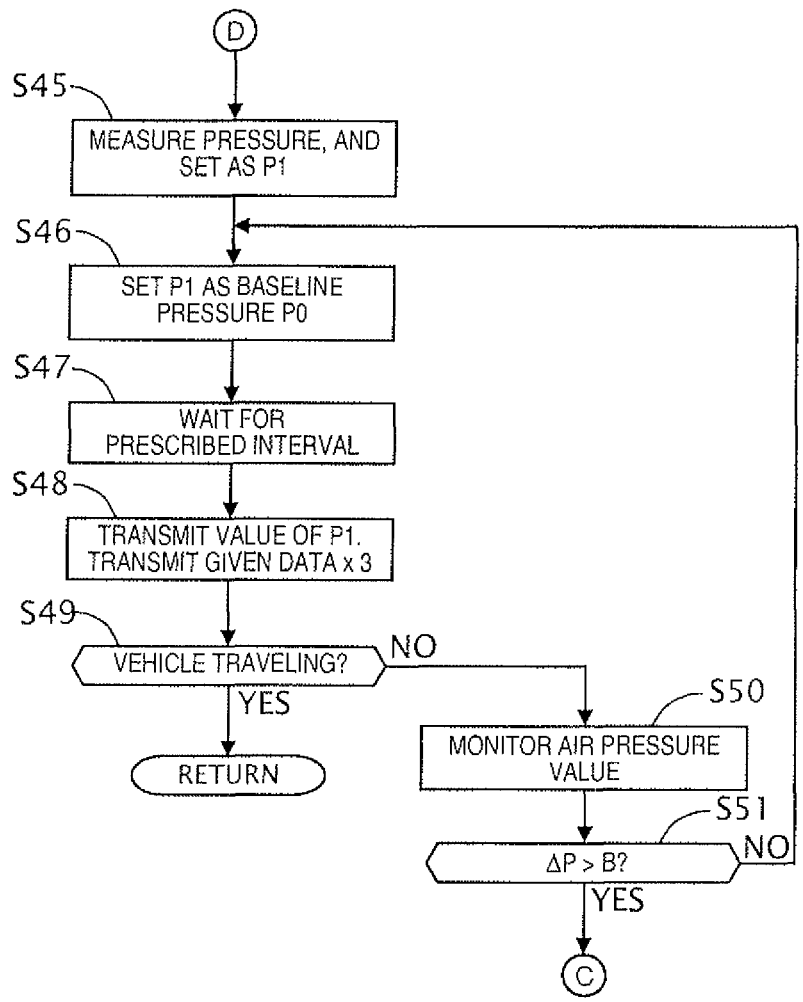
FIG. 19 is a flowchart depicting the flow of the air pressure transmission control process according to the fourth embodiment.
Figure 20:
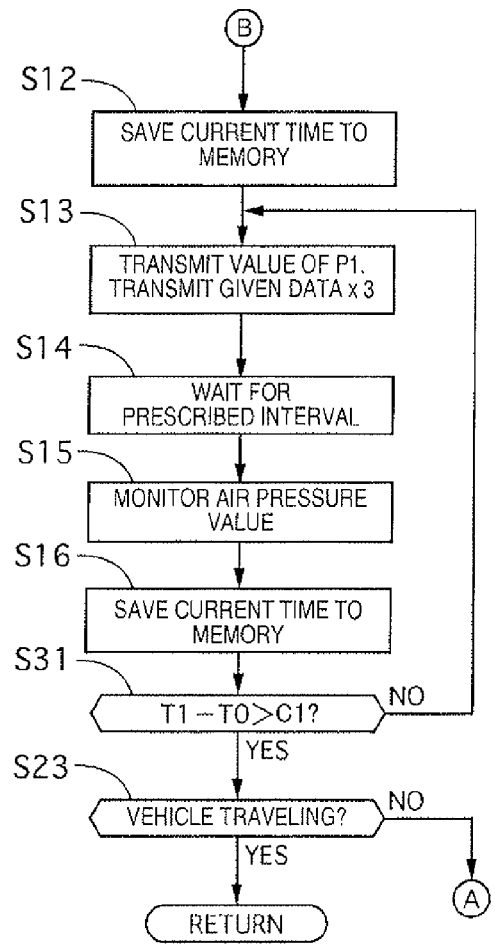
FIG. 20 is a flowchart depicting the flow of the air pressure transmission control process according to the fourth embodiment.

Alternatively, in the fourth embodiment, Step S27 in FIG. 18 and Step S48 in FIG. 19 may be omitted so that transmission is suspended when the vehicle is stopped and when the air pressure change rate ΔP is equal to or less than the change rate threshold value B or D as in the first embodiment. In such a case, energy loss while the vehicle is stopped can be reduced by suspending transmission of the transmission data.

Fifth Embodiment

Referring now to FIGS. 4 and 22, a tire air pressure detecting device, a tire air pressure monitoring system, and a tire air pressure notification method in accordance with a fifth embodiment will now be explained. In view of the similarity between the previous embodiments and the fifth embodiments, the parts of the fifth embodiment that are identical to the parts of the previous embodiments will be given the same reference numerals as the parts of the previous embodiments. Moreover, the descriptions of the parts of the fifth embodiment that are identical to the parts of the previous embodiments may be omitted for the sake of brevity.

The fifth embodiment differs from the first embodiment as described above in the control executed in step S11 of FIG. 4. More specifically, in the fifth embodiment, the air pressure change rate threshold value B after the vehicle first comes to a stop is small, and the air pressure change rate threshold value B increases with the passage of time.

The physical structures of the tire air pressure monitoring system of the fifth embodiment is identical to the physical structures of the tire air pressure monitoring system of the first embodiment as illustrated in FIGS. 1 to 3, and thus, the description thereof is omitted for the sake of brevity.

Air Pressure Transmission Control Process

The control algorithm executed by each of the tire air pressure detecting devices 2 in the fifth embodiment is substantially identical to the first embodiment depicted in FIG. 4 except that the specifics of Step S11 have been modified as follows.

In Step S11, a corrected change rate threshold value B' is calculated by subtracting from the change rate threshold value B a change rate threshold value correction quantity ΔB according to elapsed time starting after the vehicle is first stopped. Here, as depicted in FIG. 22, the characteristic of the change rate threshold value correction quantity ΔB with respect to the passage of time is such that, in response to the tire temperature drop observed just after travel stops, it progressively decreases in magnitude as time passes, and ultimately converges to zero. This characteristic is derived beforehand empirically with reference to tire volume, size and so on, and saved in memory.

Next, the air pressure change rate ΔP and the corrected change rate threshold value B' are compared. If ΔP>B', the routine advances to Step S12, and if ΔP≤B', the routine advances to Step S2.

Next, the operation will be described.

As noted in the fourth embodiment, for some time after the vehicle is first stopped, tire air pressure changes in such a way that the air pressure drops by the equivalent of the increase due to temperature change during travel. Thus, if tire inflation is carried out after the vehicle is first stopped, this drop in air pressure will be reflected in the air pressure change rate, with the detected air pressure change rate being smaller in relation to the inflation level the shorter the elapsed time since the vehicle was stopped. Consequently, where the change rate threshold value is constant, soon after the vehicle is first stopped the likelihood that the air pressure change rate exceeds the change rate threshold value will be low, so the frequency of both detecting and transmission of air pressure will fail to increase.

According to the fifth embodiment on the other hand, because the change rate threshold value B' is small when the vehicle has first stopped and progressively increases thereafter with the passage of time, even if the user happens to carry out the inflation operation soon after the vehicle has stopped, it will be possible to mitigate the effects of stopping on the change in air pressure, and the frequency of detecting and transmission of air pressure can be increased during tire inflation.

The above described process of calculating the corrected change rate threshold value B' and comparing the corrected change rate threshold value B' with the air pressure change rate ΔP can also be performed in step S30 of FIG. 12 in the second embodiment or in step S32 of FIG. 14 in the third embodiment.

The effects will now be described.

The tire air pressure monitoring system of the fifth embodiment affords the following effect in addition to effects (1) to (9) of the first embodiment, the effect (10) of the second embodiment and the effect (11) of the third embodiment.

(13) Because the frequency adjustment modules 22 increase the corrected change rate threshold value B' with the passage of time after the vehicle first stops, the effects of a drop in pressure equivalent to the increase resulting from temperature change during travel can be mitigated, and the frequency of detecting and transmission of air pressure can be increased during tire inflation so as to provide the user with frequent notification of air pressure.

Sixth Embodiment

Referring now to FIGS. 10, 15, 20, 23 and 24, a tire air pressure detecting device, a tire air pressure monitoring system, and a tire air pressure notification method in accordance with a sixth embodiment will now be explained. In view of the similarity between the previous embodiments and the sixth embodiments, the parts of the sixth embodiment that are identical to the parts of the previous embodiments will be given the same reference numerals as the parts of the previous embodiments. Moreover, the descriptions of the parts of the sixth embodiment that are identical to the parts of the previous embodiments may be omitted for the sake of brevity.

The sixth embodiment differs from the fourth embodiment in that, in sixth embodiment, the detecting frequency for a prescribed time period after the vehicle first stops is higher than the detecting frequency after the prescribed time period elapses.

The physical structures of the tire air pressure monitoring system of the sixth embodiment is identical to the physical structures of the tire air pressure monitoring system of the first embodiment as illustrated in FIGS. 1 to 3, and thus, the description thereof is omitted for the sake of brevity.

Air Pressure Transmission Control Process

FIGS. 10, 15, 20, 23, and 24 depict the control algorithm executed by each of the tire air pressure detecting devices 2 in the sixth embodiment. Only the portion of the control program executed by the ASIC 10c of the tire air pressure detecting device 2 in the sixth embodiment that differs from the fourth embodiment will be described.

Figure 23:
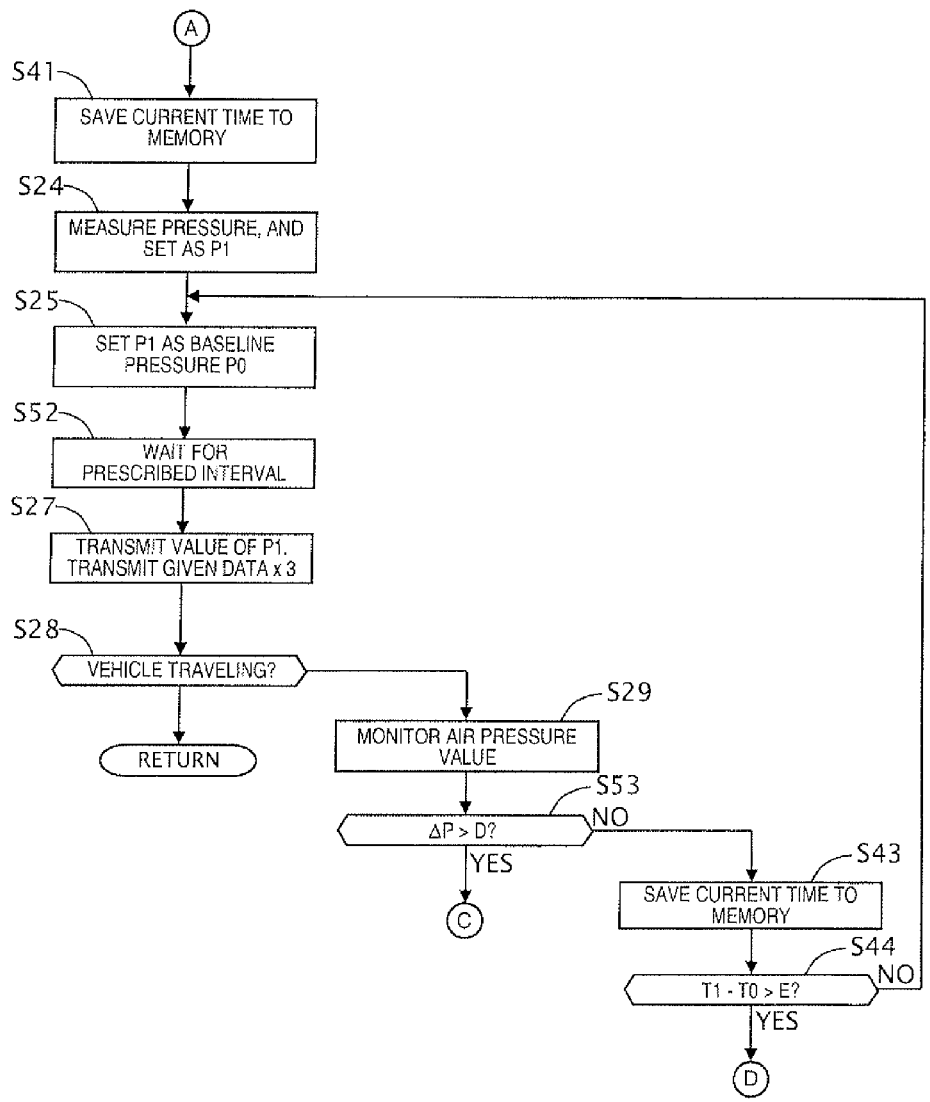
FIG. 23 is a flowchart depicting the flow of the air pressure transmission control process executed by a tire air pressure monitoring system according to a sixth embodiment of the present invention.

In Step S52 shown in FIG. 23, the ASIC 10c is configured to wait for a prescribed time interval to elapse. After the prescribed time interval has elapsed, the routine proceeds to Step S28. Here, the prescribed time interval is preferably set to 5 seconds.

In Step S53 shown in FIG. 23, the ASIC 10c is configured to determine whether the air pressure change rate ΔP exceeds the predetermined change rate threshold value D. Here, the change rate threshold value D is the same as the value used in step S42 of FIG. 18 in the fourth embodiment. As in the previous embodiments, the air pressure change rate ΔP is obtained as an absolute value of the difference |P1−P0| between P1 that was set in Step S29 and the baseline pressure P0 that was set in Step S25 per unit time used in step S52 (5 seconds). In other words, the air pressure change rate ΔP is obtained by the equation |P1−P0|/5. If the determination in step S53 is YES, then the routine advances to Step S33 shown in FIG. 15. If the determination in step S53 is NO, then the routine advances to Step S43.

Figure 24:
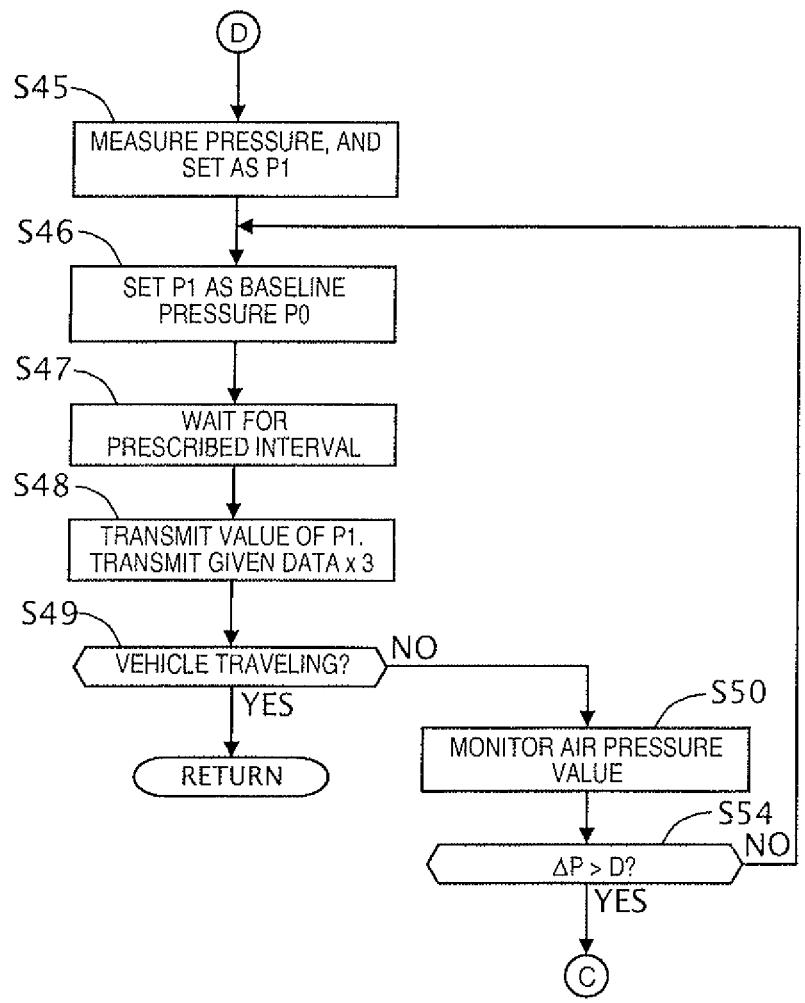
FIG. 24 is a flowchart depicting the flow of the air pressure transmission control process according to the sixth embodiment.

In Step S54 shown in FIG. 24, the ASIC 10c is configured to determine whether the air pressure change rate ΔP exceeds the predetermined change rate threshold value D. As in the previous embodiments, the air pressure change rate ΔP is obtained as an absolute value of the difference |P1−P0| between P1 that was set in Step S50 and the baseline pressure P0 that was set in Step S46 per unit time used in step S47 (15 seconds). In other words, the air pressure change rate ΔP is obtained by the equation |P1−P0|/15. If the determination in step S54 is YES, then the routine advances to Step S33 shown in FIG. 15. If the determination in step S54 is NO, then the routine returns to Step S46.

Next, the operation will be described.

In the sixth embodiment, once the vehicle stops, the detecting frequency is set to 5-second intervals (Step S52) until the end of a fixed time period E (Step S44), and thereafter when the fixed time period E has ended, the detecting frequency is switched from 5 seconds to 15 seconds (Step S47).

In most instances, inflation by the user takes place within a fixed time period after the vehicle has stopped at a gas station or the like. Thus, by increasing the detecting frequency for a prescribed time interval after stopping, and then lowering the detecting frequency after the prescribed time interval has ended, the user can be more promptly notified of the inflation results when the air pressure change rate ΔP exceeds the change rate threshold value D, that is, when the user begins to increase the air pressure. Also, by limiting the period of increased detecting frequency to the fixed time period E (e.g., 60 minutes), energy losses can be reduced.

The effects will now be described.

The tire air pressure monitoring system of the sixth embodiment affords the following effect in addition to effects (1) to (5) and (7) to (9) of the first embodiment, the effect (10) of the second embodiment, the effect (11) of the third embodiment, and the effect (12) of the fourth embodiment.

(14) Because for the prescribed time interval E after the vehicle stops, the frequency adjustment modules 22 increase the detecting frequency (5-second intervals) of the pressure sensors 10a to a level higher than the detecting frequency (15-second intervals) after the prescribed time interval E ends, the user can be more promptly notified of the inflation results, and energy losses can be reduced.

Alternatively, in the sixth embodiment, Step S27 in FIG. 23 and Step S48 in FIG. 24 may be omitted so that transmission is suspended when the vehicle is stopped and when the air pressure change rate ΔP is equal to or less than the change rate threshold value D as in the first embodiment. In such a case, energy loss while the vehicle is stopped can be reduced by suspending transmission of the transmission data.

Seventh Embodiment

Referring now to FIGS. 25 to 29, a tire air pressure detecting device, a tire air pressure monitoring system, and a tire air pressure notification method in accordance with a seventh embodiment will now be explained, In view of the similarity between the previous embodiments and the seventh embodiments, the parts of the seventh embodiment that are identical to the parts of the previous embodiments will be given the same reference numerals as the parts of the previous embodiments. Moreover, the descriptions of the parts of the seventh embodiment that are identical to the parts of the previous embodiments may be omitted for the sake of brevity.

The seventh embodiment differs from the second embodiment in that, in the seventh embodiment, the transmitting frequency is increased when the previous value and the current value of air pressure traverse a prescribed air pressure threshold value (a predetermined display content changeover threshold value) for user notification, in other words, when the prescribed air pressure threshold value falls between the previous value and the current value of air pressure.

The physical structures of the tire air pressure monitoring system of the seventh embodiment is identical to the physical structures of the tire air pressure monitoring system of the first embodiment as illustrated in FIGS. 1 to 3, and thus, the description thereof is omitted for the sake of brevity.

Air Pressure Transmission Control Process

Figure 27:
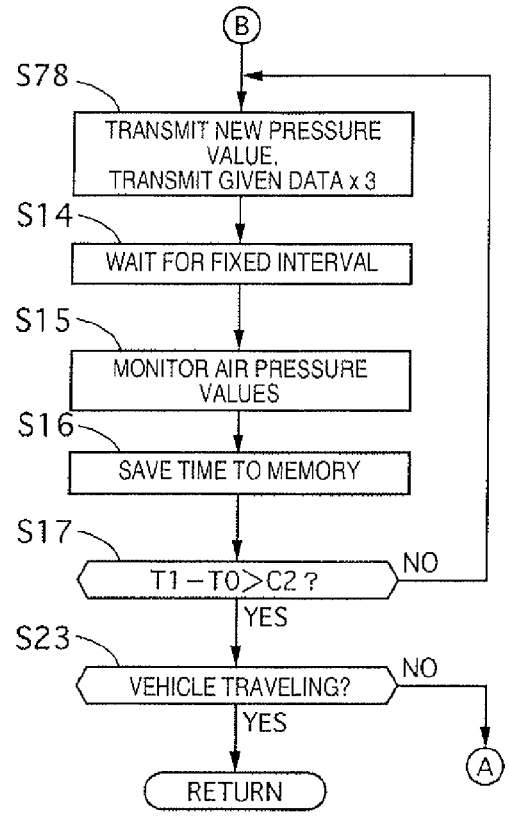
FIG. 27 is a flowchart depicting the flow of the air pressure transmission control process according to the seventh embodiment.

FIGS. 25, 26, and 27 depict the control algorithm executed by each of the tire air pressure detecting devices 2 in the seventh embodiment. Only the portion of the control program executed by the ASIC 10c of the tire air pressure detecting device 2 in the seventh embodiment that differs from the second embodiment will be explained.

In Step S60 shown in FIG. 25, the ASIC 10c is configured to transmit the pressure P1 that was set in Step S22 to the tire air pressure warning controller 4. Then, the routine then advances to Step S10.

In Step S61, the ASIC 10c is configured to save the current time in memory as T0, and then the routine advances to Step S62.

In Step S62, the ASIC 10c is configured to determine whether the pressure P1 set in Step S22 and the baseline pressure P0 set in Step S20 traverse a prescribed air pressure threshold value (a lamp light-up threshold value or a lamp turn-off threshold value), in other words, when the prescribed air pressure threshold value falls between the pressure P1 and the baseline pressure P0. If the determination in step S62 is YES, then the routine advances to Step S63. If the determination in step S62 is NO, then the routine advances to Step S78. Here, with regard to the prescribed air pressure threshold value, the lamp light-up threshold value and the lamp turn-off threshold value may have the same value; or the system may be designed to exhibit hysteresis in order to prevent hunting. The lamp light-up threshold value and the lamp turn-off threshold value are saved in memory in the ASIC 10c beforehand.

In Step S63, the ASIC 10c is configured to wait a prescribed time interval to elapse. After the prescribed time interval has elapsed, the routine proceeds to Step S64. Here, the prescribed time interval is preferably set to 10 seconds.

In Step S64, according to whether the centrifugal switch 10b is OFF, the ASIC 10c is configured to determine whether the vehicle is stopped. If the determination in step S64 is YES, then the routine advances to Step S24. If the determination in step S64 is NO, then the routine advances to Step S65.

In Step S65, the pressure sensor 10a is configured to measure the air pressure of the tire 1, and the ASIC 10c is configured to set the measured pressure as the pressure P2 and to store the pressure P2 in memory. Then, the routine advances to Step S66.

In Step S66, the ASIC 10c is configured to determine whether the pressure P2 set in Step S65 and the baseline pressure P0 set in Step S2 traverse the prescribed air pressure threshold value. If the determinant in step S66 is YES, then the routine advances to Step S67. If the determination in step S66 is NO, then the routine advances to Step S78.

In Step S67, the ASIC 10c is configured to increment the transmission counter (+1), and then the routine advances to Step S68.

In Step S68, the ASIC 10c is configured to determine whether the value of the transmission counter equals a predetermined value N_Drive. In this embodiment the predetermined value N_Drive is preferably set to 6. If the determination in step S68 is YES, then the routine advances to Step S69. If the determination in step S68 is NO, then the routine advances to Step S63. Therefore, when the pressure P1 set in Step S22 and the baseline pressure P0 set in Step S20 do not traverse a prescribed air pressure threshold value in step S62 and when the pressure P2 set in Step S65 and the baseline pressure P0 set in Step S2 do not traverse the prescribed air pressure threshold value, the transmitting frequency is set to 60-second (10×6) intervals by repeating the steps S63-S67.

In Step S69, the ASIC 10c is configured to transmit the value of the pressure P1 to the tire air pressure warning controller 4, and then the routine advances to Step S70. Here, eight identical transmission data are preferably transmitted. Given transmission data are transmitted in multiple numbers so that the data will be more reliably received by the antenna-equipped tuner 3.

In Step S70, the ASIC 10c is configured to reset the transmission counter to zero, and then the routine advances to Step S63.

In Step S71 shown in FIG. 26, the ASIC 10c is configured to save the current time in memory as T0, and then the routine advances to Step S72.

In Step S72, the ASIC 10c is configured to determine whether the pressure P1 set in Step S24 and the baseline pressure P0 set in Step S25 traverse the prescribed air pressure threshold value. If the determination in step S72 is YES, then the routine advances to Step S73. If the determination in step S72 is NO, then the routine advances to Step S78.

In Step S73, the ASIC 10c is configured to wait for a prescribed time interval to elapse. After the prescribed time interval has elapsed, the routine proceeds to Step S74. Here, the prescribed time interval is preferably set to 15 seconds.

In step S74, the ASIC 10c is configured to transmit the value of pressure P1 to the tire air pressure warning controller 4 via the corresponding antenna-equipped tuner 3. Then, the routine proceeds to Step S75. Here, three identical transmission data are preferably transmitted.

In Step S75, according to whether the centrifugal switch 10b is ON, the ASIC 10c is configured to determine whether the vehicle has started traveling. If the determination in step S75 is YES, then the routine advances to RETURN and the control flow depicted in FIGS. 25, 26 and 27 is repeated. If the determination in step S75 is NO, then the routine advances to Step S76.

In Step S76, the pressure sensor 10a is configured to measure the air pressure, and the ASIC 10c is configured to set the measured pressure as the pressure P2 and to store the pressure P2 in memory. Then, the routine advances to Step S77.

In Step S77, the ASIC 10c is configured to determine whether the pressure P2 set in Step S76 and the baseline pressure P0 set in Step S25 traverse a prescribed air pressure threshold value. If the determination in step S77 is YES, then the routine advances to Step S73. If the determination in step S77 is NO, then the routine advances to Step S78.

In Step S78, the ASIC 10c is configured to transmit the latest pressure value (P1 or P2) to the tire air pressure warning controller 4. Here, three identical transmission data are preferably transmitted. Given transmission data are transmitted in multiple numbers so that the data will be more reliably received by the antenna-equipped tuner 3.

Next, the operation will be described.

In the seventh embodiment, when the air pressure change rate ΔP exceeds the change rate threshold value (A or B), a determination is made as to whether P1 (or P2) and P0 cross the prescribed air pressure threshold value (Steps S62, S66, S72, S77), and if it is decided that air pressure has crossed the prescribed air pressure threshold value, the detecting frequency is switched from 30-second intervals to 10-second intervals during travel and from 15-second intervals to 10-second intervals with the vehicle stopped. The transmitting frequency is switched from 60-second intervals to 10-second intervals during travel and from no-transmission to 10-second intervals with the vehicle stopped (Step S14).

When air pressure falls below the lamp light-up threshold value, the tire air pressure warning controller 4 is configured to output a lamp light-up command to the warning lamp 6. When the previous value P0 and the current value (P1 or P2) for air pressure traverse the lamp turn-off threshold value, the tire air pressure warning controller 4 is configured to output a lamp turn-off command. Thus, the warning lamp 6 display remains unchanged as long as fluctuations in air pressure do not traverse the lamp turn-off threshold value. When the user increases the air pressure in the tire by inflating the tire when the vehicle is stopped, even if the transmitting frequency was increased when the air pressure change rate ΔP exceeded the change rate threshold value B, the warning lamp 6 remains lit, so energy loss is considerable.

Figure 28:
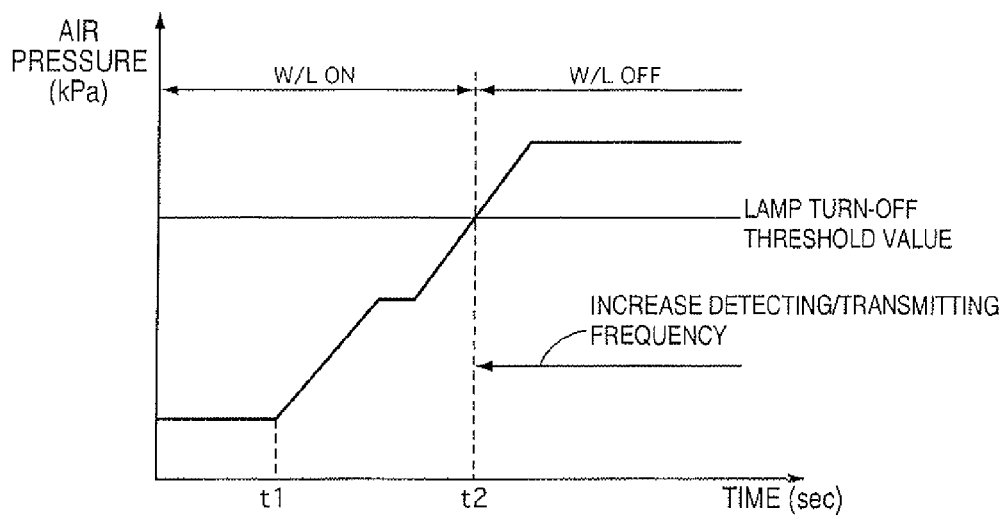
FIG. 28 is a timing chart depicting a method of setting air pressure detecting frequency and transmitting frequency according to the relationship of a lamp turnoff threshold value and air pressure during tire inflation in a tire air pressure monitoring system according to the seventh embodiment of the present invention.

Accordingly, in the seventh embodiment, when the user starts inflating tire at time t1 as shown in FIG. 28, the detecting frequency and the transmitting frequency are increased when the air pressure change rate ΔP exceeds the change rate threshold value B. Additionally, the detecting frequency and the transmitting frequency are increased at time t2 at which the previous value and the current value of air pressure traverse the lamp turn-off threshold value. Therefore, the user can promptly be notified that air pressure is in the correct range, while also limiting energy loss.

The similar air pressure transmission control of the seventh embodiment can be implemented in instances where two or more prescribed air pressure threshold value levels have been established. FIG. 29 depicts a time chart for an example in which two prescribed air pressure threshold value levels have been established. In the case of a commercial vehicle for example, it may be necessary for the proper air pressure range of the rear wheels to be higher than the proper air pressure range of the front wheels. Accordingly, in this example shown in FIG. 29, two lamp turn-off threshold values are set so that the lamp turn-off threshold value for the rear wheels is higher than the lamp turn-off threshold value for the front wheels. The ASIC 10c of the each of the tire air pressure detecting devices 2 is configured to increase the detecting frequency and the transmission frequency when the previous value and the current value of air pressure traverse the front wheel lamp turn-off threshold value or the rear wheel lamp turn-off threshold value.

In FIG. 29, although the air pressure change rate ΔP exceeds the change rate threshold value B after the user starts inflating tire at time t1, the previous value and the current value of air pressure do not traverse the lamp turn-off threshold value, and thus, the detecting frequency and transmitting frequency do not change (e.g., 15-second intervals for both detecting frequency and transmitting frequency). At time t2, because the air pressure change rate ΔP exceeds the change rate threshold value B, and the previous value and the current value of air pressure now traverse the front wheel lamp turn-off threshold value, the detecting frequency and transmitting frequency both increase (e.g., to 10-second intervals). If the tire being inflated by the user is a front tire, which can be determined by the tire ID included in the transmission data, the tire air pressure warning controller 4 is configured to output a lamp turn-off command at time t3 when it receives a signal indicating that the previous value and the current value of air pressure traverses the front wheel lamp turn-off threshold value, and thus, the warning lamp indicating the abnormality of the front wheel tire air pressure is turned OFF. Therefore, the user is notified that the tire air pressure of the front wheel is now normal, and thus, the user can subsequently stop tire air inflation operation.

On the other hand, if the tire being inflated by the user is a rear tire, the detecting frequency and transmitting frequency are switched back to the previous low transmitting frequency (e.g., 15-second intervals for both detecting frequency and transmitting frequency). Switching of the detecting frequency and transmitting frequency back to the low frequency may be performed by, for example, monitoring whether the tire air pressure exceeds a prescribed air pressure threshold value for switching the detecting and transmitting frequencies, or monitoring whether a prescribed time period has elapsed since the detecting and transmitting frequencies were increased at time t2. Although in FIG. 29, it is illustrated that the detecting and transmitting frequencies are switched back to the low frequencies at time t3 when the front wheel warning lamp is turned off, the timing for turning off the front wheel warning lamp and the timing for switching the transmitting and detecting frequencies back to the low frequencies do not necessarily need to coincide. Then, at time t4, because the previous value and the current value of air pressure now traverse the rear wheel lamp turn-off threshold value, the detecting frequency and transmitting frequency both increase (e.g., to 10-second intervals). Since the tire being inflated by the user is a rear tire, the tire air pressure warning controller 4 is configured to output a lamp turn-off command at time t5 when it receives a signal indicating that the previous value and the current value of air pressure traverses the rear wheel lamp turn-off threshold value, and thus, the warning lamp indicating the abnormality of the rear wheel tire air pressure is turned off. Therefore, the user is notified that the tire air pressure of the rear wheel is now normal, and thus, the user subsequently stops tire air inflation operation. The detecting frequency and transmitting frequency are switched back to the previous low transmitting frequency (e.g., 15-second intervals for both detecting frequency and transmitting frequency). Switching of the detecting frequency and transmitting frequency back to the low frequency may be performed by, for example, monitoring whether the tire air pressure exceeds a prescribed air pressure threshold value for switching the detecting and transmitting frequencies, or monitoring whether a prescribed time period has elapsed since the detecting and transmitting frequencies were increased at time t4. Although in FIG. 29, it is illustrated that the detecting and transmitting frequencies are switched back to the low frequencies at time t5 when the rear wheel warning lamp is turned off, the timing for turning off the rear wheel warning lamp and the timing for switching the transmitting and detecting frequencies back to the low frequencies do not necessarily need to coincide.

In this way, if it is desired to be notified of air pressure conditions through multiple ranges, the frequency of detecting and transmitting air pressure can be increased in these respective ranges (air pressure during time t2 to t3 and during time t4 to t5), thereby affording prompt notification that air pressure has reached the proper range. Meanwhile, during the interval between times t3 and t4, detecting frequency is low so energy loss is limited.

The effects will now be described.

The tire air pressure monitoring system of the seventh embodiment affords the following effect in addition to effects (1) to (5) and (7) to (9) of the first embodiment, and the effect (10) of the second embodiment.

(15) The frequency adjustment modules 22 increase the transmitting frequency when the air pressure change rate ΔP exceeds the change rate threshold value (A or B) and moreover the air pressure (P1 or P2) has changed so as to traverse a display content changeover threshold value for the warning lamp 6 (i.e. the lamp light-up threshold value or lamp turn-off threshold value). Thus, prompt notification that air pressure has reached the proper range can be afforded while limiting energy losses.

Alternatively, in the seventh embodiment, Steps S27 and S74 in FIG. 26 may be omitted so that transmission is suspended when the vehicle is stopped and when the air pressure change rate ΔP is equal to or less than the change rate threshold value B or when the pressure P1 and the baseline pressure P0 does not traverse the prescribed air pressure threshold value, as in the first embodiment. In such a case, energy loss while the vehicle is stopped can be reduced by suspending transmission of the transmission data.

Eighth Embodiment

Referring now to FIGS. 4, 30 and 31, a tire air pressure detecting device, a tire air pressure monitoring system, and a tire air pressure notification method in accordance with an eighth embodiment will now be explained. In view of the similarity between the previous embodiments and the eighth embodiments, the parts of the eighth embodiment that are identical to the parts of the previous embodiments will be given the same reference numerals as the parts of the previous embodiments. Moreover, the descriptions of the parts of the eighth embodiment that are identical to the parts of the previous embodiments may be omitted for the sake of brevity.

The eighth embodiment differs from the first embodiment in that, in the eighth embodiment, the transmitting frequency or the change rate threshold value is established based on the direction of change of air pressure.

The physical structures of the tire air pressure monitoring system of the eighth embodiment is identical to the physical structures of the tire air pressure monitoring system of the first embodiment as illustrated in FIGS. 1 to 3, and thus, the description thereof is omitted for the sake of brevity.

Air Pressure Transmission Control Process

The control algorithm executed by the ASIC 10c of the tire air pressure detecting device 2 in the eighth embodiment is substantially identical to the first embodiment depicted in FIG. 4 except for the specifics of Steps S6 and S11.

In Step S6, the ASIC 10c is configured to determine whether the air pressure change rate ΔP is larger than the change rate threshold value A (ΔP>A) and whether the pressure P1 set in step S4 is smaller than the baseline pressure P0 set in step S2 (P1−P0<0). If both of the conditions (ΔP>A and P1−P0<0) are satisfied, then the routine advances to Step S12. Otherwise, the routine advances to step S7.

In Step S11, the ASIC 10c is configured to determine whether the pressure P1 set in step S4 is smaller than the baseline pressure P0 set in step S2 (P1−P0<0), whether the air pressure change rate ΔP is larger than the change rate threshold value A (ΔP>A). If the ASIC 10c determines that the pressure P1 is smaller than the baseline pressure P0 (P1−P0<0), the ASIC 10c is further configured to determine whether the air pressure change rate ΔP is larger than the change rate threshold value A (ΔP>A). If both conditions (P1−P0<0 and ΔP>A) are satisfied, then the routine advances to Step S12. If the air pressure change rate ΔP is not larger than the change rate threshold value A (P1−P0<0 and ΔP≤A), then the routine returns to Step S2. On the other hand, if the ASIC 10c determines that the pressure P1 is not smaller than the baseline pressure P0 (P1−P0>0), the ASIC 10c is further configured to determine whether the air pressure change rate ΔP is larger than the change rate threshold value B (ΔP>B). If both conditions (P1−P0≥0 and ΔP>B) are satisfied, then the routine advances to Step S12. If the air pressure change rate ΔP is not larger than the change rate threshold value B (P1−P0≥0 and ΔP≤B), then the routine returns to Step S2.

Next, the operation will be described.

In the eighth embodiment, during travel, when the air pressure change rate ΔP has exceeded the change rate threshold value A, if P1−P0<0, that is, if air pressure is changing in the decreasing direction, the frequency of detecting and transmitting air pressure is increased. If on the other hand air pressure is changing in the increasing direction, the frequency of detecting and transmitting air pressure is unchanged.

As depicted in FIG. 30, during travel it is necessary to notify the user more promptly if a puncture occurs. However, it is not necessary for the user to be notified of rise in air pressure associated with travel. Thus, energy loss can be reduced by not increasing the frequency of detecting and transmitting air pressure in that case.

In the eighth embodiment, with the vehicle stopped, A serves as the change rate threshold value used for comparison with the air pressure change rate ΔP if air pressure is changing in the decreasing direction; and B serves as the change rate threshold value used if air pressure is changing in the increasing direction. As shown in FIG. 31, possible conditions that would produce a sudden change in air pressure with the vehicle at a stop include inflation by the user, and punctures. Thus, by taking into account the direction of change of air pressure, optimal change rate threshold values can be established for use during punctures and during tire inflation, respectively.

Here, because the change rate threshold value B is smaller than the change rate threshold value A, even if the change rate threshold value remains fixed at B when the vehicle is stopped, the frequency of detecting and transmitting air pressure can be increased if a puncture occurs. In this case, the frequency of detecting and transmitting air pressure will also increase if air pressure rises for some cause other than a puncture, resulting in energy losses. Accordingly, it is preferable to establish change rate threshold values based on the direction of change of air pressure when the vehicle is stopped as well.

The effects will now be described.

The tire air pressure monitoring system of the eighth embodiment affords the following effects in addition to effects (1) to (9) of the first embodiment.

(16) The frequency adjustment modules 22 increase the transmitting frequency when, during travel, the air pressure change rate ΔP exceeds the change rate threshold value A and air pressure is changing in the decreasing direction, thereby limiting energy losses.

(17) The frequency adjustment modules 22 establish a change rate threshold value A used when air pressure is changing in the decreasing direction, and that is greater than the change rate threshold value B air pressure is changing in the increasing direction. Thus, optimal change rate threshold values can be established for use during a puncture and during tire inflation, respectively.

Ninth Embodiment

Referring now to FIGS. 4 and 32, a tire air pressure detecting device, a tire air pressure monitoring system, and a tire air pressure notification method in accordance with a ninth embodiment will now be explained. In view of the similarity between the previous embodiments and the ninth embodiments, the parts of the ninth embodiment that are identical to the parts of the previous embodiments will be given the same reference numerals as the parts of the previous embodiments. Moreover, the descriptions of the parts of the ninth embodiment that are identical to the parts of the previous embodiments may be omitted for the sake of brevity.

The ninth embodiment differs from the first embodiment in that, in the ninth embodiment, transmitting frequency increases when air pressure approaches a prescribed air pressure threshold value of which the user should be notified.

The physical structures of the tire air pressure monitoring system of the ninth embodiment is identical to the physical structures of the tire air pressure monitoring system of the first embodiment as illustrated in FIGS. 1 to 3, and thus, the description thereof is omitted for the sake of brevity.

Air Pressure Transmission Control Process

The control algorithm executed by the ASIC 10c of the tire air pressure detecting device 2 in the ninth embodiment is substantially identical to the first embodiment depicted in FIG. 4, except for the specifics of Steps S6 and S11.

In Step S6, the ASIC 10c is configured to determine whether the air pressure change rate ΔP is larger than the change rate threshold value A (ΔP>A) and whether a difference between P1 set in step S4 and a predetermined air pressure threshold value (the lamp light-up threshold value or lamp turn-off threshold value) is equal to or less than a predetermined value. If the both determinations are YES, then the routine advances to Step S12. Otherwise, the routine advances to Step S7.

In Step S11, the ASIC 10c is configured to determine whether the air pressure change rate ΔP is larger than the change rate threshold value B (ΔP>B) and whether a difference between P1 set in step S4 and a predetermined air pressure threshold value (the lamp light-up threshold value or lamp turn-off threshold value) is equal to or less than the predetermined value. If the both determinations are YES, then the routine advances to Step S12. Otherwise, the routine returns to Step S2.

Next, the operation will be described.

In the ninth embodiment, when the air pressure change rate ΔP exceeds the change rate threshold value (A or B) and P1 approaches a specific threshold value, the frequency of detecting and transmitting air pressure increases. On the other hand, if the air pressure change rate ΔP exceeds the change rate threshold value but P1 is far away from the specific threshold value, detecting and transmitting frequency remain unchanged.

For example, as shown in FIG. 32, where the user is carrying out an inflation operation, when the air pressure approaches the lamp light-up/turn-off threshold value, the frequency of detecting and transmitting air pressure increases so that the light-up/shutoff decision can be made more promptly. If on the other hand the air pressure is far away from the lamp light-up/turn-off threshold value, since there is no need to switch between lighting and extinguishing the warning lamp 6, there is no purpose in frequently receiving air pressure values. Thus, in this case, the frequency of detecting and transmitting air pressure is lowered to limit energy loss.

The effects will now be described.

The tire air pressure monitoring system of the ninth embodiment affords the following effect in addition to effects (1) to (9) of the first embodiment.

(18) The frequency adjustment modules 22 increase the transmitting frequency when the air pressure change rate ΔP exceeds the change rate threshold value (A or B), and moreover the difference between the air pressure P1 and the threshold value to modify the display of the warning lamp 6 (lamp light-up/turn-off threshold value) is equal to or less than a predetermined value. Thus, while limiting energy loss, prompt notification as to whether air pressure is in the proper range can be afforded.

Tenth Embodiment

Referring now to FIGS. 4 and 33, a tire air pressure detecting device, a tire air pressure monitoring system, and a tire air pressure notification method in accordance with a tenth embodiment will now be explained. In view of the similarity between the previous embodiments and the tenth embodiments, the parts of the tenth embodiment that are identical to the parts of the previous embodiments will be given the same reference numerals as the parts of the previous embodiments. Moreover, the descriptions of the parts of the tenth embodiment that are identical to the parts of the previous embodiments may be omitted for the sake of brevity.

The ninth embodiment differs from the first embodiment in that, in the tenth embodiment, during tire inflation, air pressure is transmitted at given increments of change in air pressure.

The physical structures of the tire air pressure monitoring system of the tenth embodiment is identical to the physical structures of the tire air pressure monitoring system of the first embodiment as illustrated in FIGS. 1 to 3, and thus, the description thereof is omitted for the sake of brevity.

Air Pressure Transmission Control Process

The control algorithm executed by the ASIC 10c of the tire air pressure detecting device 2 in the tenth embodiment is substantially identical to the first embodiment depicted in FIG. 4, except for the specifics of Step S14.

In Step S14, the ASIC 10c is configured to wait for the difference between the pressure P1 set in Step S15 and the previous value of the pressure P1 that was set in Step S15 in the previous cycle to exceed a predetermined quantity, and when the predetermined quantity has been exceeded, the routine proceeds to Step S15. Here, in the initial cycle, the pressure P1 that was set in Step S4 is used in place of P1 that was set in Step S15. If the difference between the current value and the previous value of the pressure P1 fails to exceed the predetermined quantity even after a predetermined time interval C (e.g., 30 minutes) has passed, the routine advances to RETURN and the modified control flow depicted in FIG. 4 is repeated.

Next, the operation will be described.

In the tenth embodiment, air pressure is transmitted in Step S13 after first waiting for a given air pressure change in Step S14. Thus, when the inflation procedure is being carried out by the user with an inflation tool having good performance, once inflation is detected, the air pressure presented to the user will change at substantially fixed intervals as depicted in FIG. 33 (a). If on the other hand the inflation procedure is being carried out using an inflation tool with poor performance, once inflation is detected, the air pressure subsequently fails to be updated indefinitely, as depicted in FIG. 33 (b). Accordingly, the user can be made aware of using an inflation tool with poor performance. The user can thus be prompted to exchange the inflation tool for one having better performance.

The effects will now be described.

The tire air pressure monitoring system of the tenth embodiment affords the following effect in addition to effects (1) to (9) of the first embodiment.

(19) Once the air pressure change rate ΔP has exceeded the change rate threshold value B with the vehicle stopped, the frequency adjustment modules 22 transmit wireless signals each time that the change in air pressure fluctuates by a predetermined amount. Thus, the user can be made aware if he or she is using an inflation tool with poor performance, and can be prompted to exchange the inflation tool for one having better performance.

Eleventh Embodiment

Referring now to FIGS. 34 and 35, a tire air pressure detecting device, a tire air pressure monitoring system, and a tire air pressure notification method in accordance with an eleventh embodiment will now be explained. In view of the similarity between the previous embodiments and the eleventh embodiments, the parts of the eleventh embodiment that are identical to the parts of the previous embodiments will be given the same reference numerals as the parts of the previous embodiments. Moreover, the descriptions of the parts of the eleventh embodiment that are identical to the parts of the previous embodiments may be omitted for the sake of brevity.

In the eleventh embodiment, during tire inflation, the user is notified of inflation conditions by the horn or the hazard lamps. This control in the eleventh embodiment can be combined with any of the first to tenth embodiments as described above.

The physical structures of the tire air pressure monitoring system of the eleventh embodiment is identical to the physical structures of the tire air pressure monitoring system of the first embodiment as illustrated in FIGS. 1 to 3, and thus, the description thereof is omitted for the sake of brevity.

Air Pressure Transmission Control Process

FIG. 34 depicts the control algorithm executed by the tire air pressure warning controller 4 in the eleventh embodiment. Through repeated execution of the control program depicted in FIG. 34 at a constant frequency, the tire air pressure warning controller 4 is configured to use the horn 7 or the hazard lamps (by simultaneously flashing the turn signals 8 at left and right at front and back) to notify the user of the inflation conditions. The process takes place in the following manner for each wheel.

In Step S81, the tire air pressure warning controller 4 is configured to determine whether the ignition switch of the vehicle is ON. If the determination in step S81 is YES, then the routine advances to Step S82. If the determination in step S81 is NO, then the routine advances to RETURN and the control flow depicted in FIG. 34 is repeated.

In Step S82, the tire air pressure warning controller 4 is configured to determine whether vehicle speed V is 3 km/h or less in order to determine whether the vehicle is stopped. If the determination in step S82 is YES, then the routine advances to Step S83. If the determination in step S82 is NO, the routine advances to RETURN and the control flow depicted in FIG. 34 is repeated.

In Step S83, the tire air pressure warning controller 4 is configured to determine whether a signal representing that the air pressure change rate ΔP has exceeded the change rate threshold value B has been received in addition to air pressure from the tire air pressure detecting devices 2. If the determination in step S83 is YES, then the routine advances to Step S85. If the determination in step S83 is NO, then the routine advances to Step S84. When the tire air pressure detecting device 2 in one of the first to tenth embodiments is combined with the control described in the eleventh embodiment, the tire air pressure detecting device 2 in one of the first to tenth embodiments is preferably configured such that, when the air pressure change rate ΔP exceeds the change rate threshold value B, the ASIC 10c transmits a signal indicative of this fact (the air pressure change rate ΔP exceeds the change rate threshold value B) accordingly, together with a signal indicative of the value of the air pressure measured by the pressure sensor 10a.

In Step S84, the tire air pressure warning controller 4 is configured to update the received air pressure value received from the tire air pressure detecting device 2, and then the routine advances to RETURN and the control flow depicted in FIG. 34 is repeated.

In Step S85, the tire air pressure warning controller 4 is configured to determine whether air pressure was received from the tire air pressure detecting device 2 two or more times subsequent to a YES determination in Step S83. If the determination in step S85 is YES, then the routine advances to Step S86. If the determination in step S85 is NO, then the routine advances to RETURN and the control flow depicted in FIG. 34 is repeated.

In Step S86, the tire air pressure warning controller 4 is configured to determine whether the air pressure value lies in a lower zone than a prescribed zone. If the determination in step S86 is YES, then the routine advances to Step S93. If the determination in step S86 is NO, then the routine advances to Step S87. Here, the prescribed zone is set to the correct range (normal range) of tire air pressure for the wheel.

In Step S87, the tire air pressure warning controller 4 is configured to determine whether the air pressure value lies in the prescribed zone. If the determination in step S87 is YES, then the routine advances to Step S92. If the determination in step S87 is NO, then the routine advances to Step S88.

In Step S88, the tire air pressure warning controller 4 is configured to determine whether the air pressure value lies in an overinflation zone. If the determination in step S88 is YES, then the routine advances to Step S89. If the determination in step S88 is NO, then the routine advances to Step S91. Here, the overinflation zone is set to a zone in which tire air pressure exceeds the prescribed zone (normal zone), and which necessitates reduction in tire air pressure. The lower limit of the overinflation zone may be set to a pressure level above that of the upper limit of the prescribed zone.

In Step S89, the tire air pressure warning controller 4 is configured to compare the current value and the previous value of air pressure, and to determine whether air pressure is increasing. If the determination in step S89 is YES, then the routine advances to Step S90. If the determination in step S89 is NO, then the routine advances to Step S91.

In Step S90, the tire air pressure warning controller 4 is configured to control the horn 7 through the output circuit 4f so that the horn 7 is sounded three times, and then the routine advances to RETURN and the control flow depicted in FIG. 34 is repeated.

In Step S91, the tire air pressure warning controller 4 is configured to turn on the hazard lights (the turn signals 8) through the display driver circuits 4g, and then the routine advances to RETURN and the control flow depicted in FIG. 34 is repeated. In the eleventh embodiment, when the hazard lights are turned on, the turn signs 8 flash for a predetermined number of times or for a predetermined duration.

In Step S92, the tire air pressure warning controller 4 is configured to control the horn 7 through the output circuit 4f so that the horn 7 is sounded once, and to turn on the hazard lights (the turn signals 8) through the display driver circuits 4g, and then the routine advances to RETURN and the control flow depicted in FIG. 34 is repeated.

In Step S93, the tire air pressure warning controller 4 is configured to compare the current value and the previous value of air pressure, and to determine whether air pressure is increasing. If the determination in step S93 is YES, then the routine advances to Step S94. If the determination in step S93 is NO, and then the routine advances to RETURN and the control flow depicted in FIG. 34 is repeated.

In Step S94, the tire air pressure warning controller 4 is configured to turn on the hazard lights, and then the routine advances to RETURN and the control flow depicted in FIG. 34 is repeated.

Next, the operation will be described.

FIG. 35 is a timing chart depicting change in air pressure during tire inflation. The user starts the inflation procedure at time t1.

Between time t1 and t2, the air pressure lies in a zone below the prescribed zone, and pressure is increasing. Thus, in the flowchart of FIG. 34, the flew repeatedly advances through Step S81→Step S82→Step S83→Step S85→Step S86→Step S93→Step S94, and the hazard lamps (the turn signals 8) flash in sync with the transmitting frequency (e.g., 10-second intervals) of the tire air pressure detecting device 2. This provides the user with visual confirmation that air pressure is approaching target pressure (pressure within the prescribed zone).

Between time t2 and t3, the air pressure has reached the prescribed zone, so the flow advances through Step S81→Step S82→Step S83→Step S85→Step S86→Step S87→Step S92, and the horn 7 sounds once while the hazard lamps flash. The user is thereby notified by a single audible alert sound of the horn 7 that air pressure is in the correct range.

Between time t3 and t4, the air pressure exceeds the prescribed zone, so the flow advances through Step S81→Step S82→Step S83→Step S85→Step S86→Step S87 Step S88→Step S91, the horn 7 ceases to emit an audible alert, and the hazard lamps flash. The user is thereby notified by the horn 7 going silent that air pressure has exceeded the prescribed zone.

Between time t4 and t5, the air pressure has reached the overinflation zone, and pressure is increasing. Thus, the flow advances through Step S81→Step S82→Step S83→Step S85→Step S86→Step S87→Step S88→Step S89→Step S90, and the horn 7 sounds three times. The user is thereby notified by three audible alert sounds of the horn 7 that air pressure is in the overinflation zone.

Between time t5 and t6, the air pressure is decreasing, so the flow advances through Step S81→Step S82→Step S83→Step S85→Step S86→Step S87→Step S88→Step S91, the horn 7 stops, and the hazard lamps flash. This provides the user with visual confirmation that air pressure is approaching target pressure.

The period between time t6 and t7 is comparable to that between time t2 and t3.

At time t7, the user ends the tire inflation operation.

In the eleventh embodiment, when the user carries out a tire inflation operation, the user is notified through different numbers of audible alert sounds whether the air pressure is in the prescribed zone or in the overinflation zone. Additionally, if the air pressure lies in a zone below the prescribed zone or in the overinflation zone, flashing of the hazard lamps provides notification of the direction of change in air pressure. This enables the user to easily adjust the air pressure to the target pressure.

The effects will now be described.

As the control in the eleventh embodiment as described above is combined with any of the first to tenth embodiments as described above, the tire air pressure monitoring system of the eleventh embodiment affords the following effect in addition to the effects of the first to tenth embodiments.

(20) Since the horn 7 and the turn signals 8 provide the observer outside the vehicle with notification of air pressure conditions during tire inflation, air pressure can be easily adjusted to the target pressure, affording enhanced convenience during tire inflation.

While only selected embodiments have been chosen to illustrate the present invention, it will be apparent to those skilled in the art from this disclosure that various changes and modifications can be made herein without departing from the scope of the invention as defined in the appended claims. For example, features taught in the first to eleventh embodiments may be combined, where to do so does not give rise to inconsistencies.

In the first to eleventh embodiments, a warning lamp is employed as the display unit; however, a reading on a display, or a sound from a speaker could be employed instead.

While embodiments show examples in which the tire air pressure detecting devices 2 are provided to all of the wheels, they could be provided to the front wheels only or to the rear wheels only.

In the eleventh embodiment, the horn 7 and the hazard lights (turn signals 8) are employed as the alerting unit; however, other means, such as illumination of the headlamps, could be employed provided that the alerting unit is discernible from outside the vehicle.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the tire air pressure monitoring system. Accordingly, these terms, as utilized to describe the present invention should be interpreted relative to a vehicle equipped with the tire air pressure monitoring system. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A tire air pressure detecting device comprising:
an air pressure detecting unit configured and arranged to detect a tire air pressure of a tire mounted to a vehicle;
a transmitting unit configured and arranged to transmit a detected value of the tire air pressure detected by the air pressure detecting unit;
a running state detecting unit configured and arranged to detect a running state of the vehicle;
an air pressure change rate detecting section configured to detect an air pressure change rate at which the tire air pressure changes; and
a frequency adjustment section configured to adjust a transmitting frequency at which the detected value of the tire air pressure detected by the air pressure detecting unit is externally transmitted by the transmitting unit according to the running state detected by the running state detecting unit and the air pressure change rate detected by the air pressure change rate detecting section, the frequency adjustment section being further configured to variably set an air pressure change rate threshold value for switching the transmitting frequency from low frequency to high frequency according to the running state, such that the frequency adjustment section sets the air pressure change rate threshold value used while the running state indicates a low-speed travel state of the vehicle to a smaller value than the air pressure change rate threshold value used while the running state indicates a high-speed travel state of the vehicle so that the transmitting frequency is changed from the low frequency to the high frequency at a value of the detected air pressure change rate that is lower for the low-speed travel state than a value of the detected air pressure change rate for the high-speed travel state.

2. The tire air pressure detecting device according to claim 1, wherein
the frequency adjustment section is configured to set the air pressure change rate threshold value so that the transmitting frequency is increased according to the air pressure change rate.

3. The tire air pressure detecting device according to claim 1, wherein
the frequency adjustment section is configured to set the low frequency of the transmitting frequency when the vehicle is stopped so that transmission from the transmitting unit is suspended.

4. The tire air pressure detecting device according to claim 1, wherein
the frequency adjustment section is configured to set a detecting frequency at which the tire air pressure is detected by the air pressure detecting unit when the vehicle is stopped higher than the detecting frequency when the vehicle is traveling.

5. The tire air pressure detecting device according to claim 1, wherein
the frequency adjustment section is configured to increase a detecting frequency at which the tire air pressure is detected by the air pressure detecting unit prior to elapsing of a predetermined time period after the vehicle has stopped so as to be higher than the detecting frequency after the predetermined time period has elapsed.

6. The tire air pressure detecting device according to claim 1, wherein
the frequency adjustment section is configured to increase the transmitting frequency when the air pressure change rate has exceeded the air pressure change rate threshold value and change in the tire air pressure has crossed a predetermined display content changeover threshold value for changing a content that is to be displayed to the driver.

7. The tire air pressure detecting device according to claim 1, wherein
the frequency adjustment section is configured to increase the transmitting frequency when the air pressure change rate has exceeded the air pressure change rate threshold value, and a difference between the tire air pressure and a predetermined display content changeover threshold value for switching a content displayed to the driver is equal to or less than a predetermined value.

8. The tire air pressure detecting device according to claim 1, wherein
the frequency adjustment section is configured to increase the transmitting frequency when, during travel, the air pressure change rate has exceeded the air pressure change rate threshold value and the tire air pressure has changed to a decreasing direction.

9. The tire air pressure detecting device according to claim 1, wherein
the frequency adjustment section is configured to increase the air pressure change rate threshold value when, with the vehicle stopped, the tire air pressure has changed to a decreasing direction, so as to be greater than the air pressure change rate threshold value when the tire air pressure has changed to an increasing direction.

10. The tire air pressure detecting device according to claim 1, wherein
the frequency adjustment section is configured to control the transmitting unit to externally transmit the detected value of the tire air pressure each time a degree of air pressure variation fluctuates by a predetermined amount once the air pressure change rate has exceeded the air pressure change rate threshold value with the vehicle stopped.

11. The tire air pressure detecting device according to claim 1, wherein
the running state detecting unit is configured and arranged to detect a travel speed of the vehicle, and
the frequency adjustment section is configured to set the air pressure change rate threshold value so that the transmitting frequency is increased according to the travel speed.

12. The tire air pressure detecting device according to claim 2, wherein
the frequency adjustment section is configured to set the air pressure change rate threshold value used during a low-speed travel state of the vehicle to a smaller value than the air pressure change rate threshold value used during a high-speed travel state of the vehicle.

13. The tire air pressure detecting device according to claim 1, wherein
the frequency adjustment section is configured to maintain the high frequency of the transmitting frequency until a prescribed duration time has elapsed after the transmitting frequency is switched from the low frequency to the high frequency according to the air pressure change rate.

14. The tire air pressure detecting device according to claim 13, wherein
the frequency adjustment section is configured to set the prescribed duration time shorter when the vehicle is traveling than when the vehicle is stopped.

15. The tire air pressure detecting device according to claim 1, wherein
the frequency adjustment section is configured to set the air pressure change rate threshold value according to time elapsed immediately after the vehicle stops.

16. The tire air pressure detecting device according to claim 15, wherein
the frequency adjustment section is configured to increase the air pressure change rate threshold value according to time elapsed immediately after the vehicle stops.

17. A tire air pressure monitoring system comprising:
the tire air pressure detecting device according to claim 1, with the air pressure detecting unit being attached to a wheel of a vehicle, the tire air pressure detecting device being configured and arranged to externally transmit the detected value of the tire air pressure detected by the air pressure detecting unit at the transmitting frequency set by the frequency adjustment section;
a vehicle-side receiver configured and arranged to receive the tire air pressure transmitted from the tire air pressure detecting device; and
a control unit configured to present information relating to the tire air pressure to a driver of the vehicle.

18. The tire air pressure monitoring system according to claim 17, further comprising
an alerting unit configured and arranged to notify to an outside of the vehicle a state of the tire air pressure when the tire air pressure is being increased.

19. A tire air pressure notification method comprising:
detecting a tire air pressure of a tire mounted to a vehicle;
detecting an air pressure change rate at which the tire air pressure changes;
detecting a running state in which the vehicle is running;
adjusting a transmitting frequency at which the detected value of the tire air pressure is transmitted according to the detected running state and the detected air pressure change rate;
variably setting, based on the detected vehicle running state, an air pressure change rate threshold value for switching the transmitting frequency between low frequency to high frequency, such that the variably setting sets the air pressure change rate threshold value used while the detected vehicle running state indicates a low-speed travel state of the vehicle to a smaller value than the air pressure change rate threshold value used while the detected vehicle running state indicates a high-speed travel state of the vehicle so that the transmitting frequency is changed from the low frequency to the high frequency at a value of the detected air pressure change rate that is lower for the low-speed travel state than a value of the detected air pressure change rate for the high-speed travel state; and
transmitting the detected value of the tire air pressure at the transmitting frequency.

* * * * *